(12) United States Patent
Bellinger et al.

(10) Patent No.: US 10,107,924 B2
(45) Date of Patent: Oct. 23, 2018

(54) HIGH-EFFICIENCY MICROSTRUCTURED SEMICONDUCTOR NEUTRON DETECTORS AND PROCESS TO FABRICATE HIGH-EFFICIENCY MICROSTRUCTURED SEMICONDUCTOR NEUTRON DETECTORS

(71) Applicant: RADIATION DETECTION TECHNOLOGIES, INC., Manhattan, KS (US)

(72) Inventors: Steven L. Bellinger, Manhattan, KS (US); Ryan G. Fronk, Manhattan, KS (US); Douglas S. McGregor, Riley, KS (US)

( * ) Notice: Subject to any disclaimer, the term of this patent is extended or adjusted under 35 U.S.C. 154(b) by 0 days.

(21) Appl. No.: 15/206,426

(22) Filed: Jul. 11, 2016

(65) Prior Publication Data

US 2017/0010370 A1 Jan. 12, 2017

Related U.S. Application Data

(60) Provisional application No. 62/191,374, filed on Jul. 11, 2015.

(51) Int. Cl.
*G01T 3/08* (2006.01)

(52) U.S. Cl.
CPC ..................... *G01T 3/08* (2013.01)

(58) Field of Classification Search
CPC .... G01T 3/08; G01T 3/06; G01T 3/00; H01L 31/115
USPC ............ 250/370.05, 390.01, 390.11, 390.02
See application file for complete search history.

(56) References Cited

U.S. PATENT DOCUMENTS

| 5,880,471 | A | 3/1999 | Schelten et al. |
| 6,545,281 | B1* | 4/2003 | McGregor ............... G01T 3/08 250/370.05 |
| 7,164,138 | B2 | 1/2007 | McGregor et al. |
| 7,855,372 | B2 | 12/2010 | McGregor et al. |
| 8,778,715 | B2 | 7/2014 | Bellinger et al. |
| 9,595,628 | B1* | 3/2017 | Okandan ............... H01L 31/115 |

(Continued)

OTHER PUBLICATIONS

Bellinger, S.L. et al., 2012, "High-efficiency microstructured semiconductor neutron detectors that are arrayed, dual-integrated, and stacked", Applied Radiation and Isotopes, 70 (7), pp. 1121-1124.*

(Continued)

*Primary Examiner* — David Porta
*Assistant Examiner* — Blake Riddick

(57) ABSTRACT

A semiconductor neutron detector and a semiconductor process is provided to manufacture a semiconductor neutron detector. First, a substrate with flat surface having a dielectric layer is formed thereon is provided. Thereafter, a masking pattern is applied and etched into the dielectric layer to expose semiconductor features on opposite sides of the substrate. The semiconductor substrate is submerged into an etchant composed of a semiconductor etching solution to etch deep cavities into the substrate in the exposed regions. Afterwards, dopant impurities are introduced and are driven into the semiconductor, under high temperature, into opposite sides of the etched features to produce one or more rectifying junctions. Afterwards, LiF and/or B particles are forced into the cavities through high velocity methods.

14 Claims, 17 Drawing Sheets

(56) References Cited

U.S. PATENT DOCUMENTS

| | | | | |
|---|---|---|---|---|
| 2005/0258372 | A1* | 11/2005 | McGregor | G01T 1/185 250/390.01 |
| 2009/0014662 | A1* | 1/2009 | Suhami | G01T 3/06 250/390.11 |
| 2009/0302231 | A1* | 12/2009 | McGregor | G01T 3/08 250/390.03 |
| 2012/0132819 | A1* | 5/2012 | Climent | G01T 3/08 250/370.05 |
| 2012/0235260 | A1* | 9/2012 | Nikolic | G01T 3/08 257/429 |
| 2012/0313196 | A1* | 12/2012 | Li | H01L 27/1446 257/429 |
| 2013/0075848 | A1* | 3/2013 | Nikolic | H01L 31/085 257/429 |
| 2013/0187056 | A1* | 7/2013 | Nikolic | G01T 3/00 250/370.05 |
| 2013/0334541 | A1* | 12/2013 | Voss | H01L 29/0657 257/77 |
| 2013/0344636 | A1* | 12/2013 | Bellinger | H01L 31/18 438/56 |
| 2014/0077089 | A1* | 3/2014 | Orava | G01T 3/08 250/370.05 |
| 2014/0252520 | A1* | 9/2014 | Dahal | G01T 3/00 257/429 |
| 2016/0356901 | A1* | 12/2016 | Shao | H01L 31/115 |
| 2017/0133543 | A1* | 5/2017 | Dahal | H01L 31/115 |
| 2017/0139060 | A1* | 5/2017 | Dahal | G01T 1/24 |

OTHER PUBLICATIONS

Shultis, J.K., et al., IEEE Trans. Nuclear Science, NS-53 (2006), "Efficiencies of Coated and Perforated Semiconductor Neutron Detectors." pp. 1659-1665.

Shultis, J.K., et al., Proc. SPIE, vol. 7079 (2008), "Designs for Micro-Structured Semiconductor Neutron Detectors." pp. 06 1-06 15.

Shultis, J.K., et al., Nuclear Instruments and Methods, A606 (2009), Design and Performance Considerations for Perforated Semiconductor Thermal-Neutron Detectors. pp. 608-636.

Solomon, C.J., et al., Nuclear Instruments and Methods, A580 (2007), A hybrid method for coupled neutron-ion transport calculations for 10B and 6LiF coated and perforated detector efficiencies. pp. 326-330.

Solomon, C.J., et al., IEEE Nuclear Science Symp., Oct. 28-Nov. 3, 2007, "Angular Efficiency Design Considerations for Perforated Semiconductor Neutron Detectors." pp. 1555-1559.

Solomon, C.J., et al., Nuclear Instruments and Methods, A618 (2010), "Reduced Efficiency Variation in Perforated Neutron Detectors with Sinusoidal Trench Design." pp. 260-265.

Unruh, T.C., et al., Nuclear Instruments and Methods, A604 (2009), "Design and Operation of a 2D Thin Film Semiconductor Neutron Detector Array for use as a Beamport Monitor." pp. 1-4.

Muminov, et al., Plenum Publishing Corporation (1987), "High-Efficiency Semiconductor Thermal-Neutron Detectors." pp. 316-319.

Bean, K.E., IEEE Transactions Electron Devices, vol. ED-25, No. 10, (Oct. 1978), "Anisotropic Etching of Silicon." pp. 1185-1193.

Bellinger, S.L., et al., IEEE Nuclear Science Symp., N31-3 (2007), "Angular Response of Perforated Silicon Diode High Efficiency Neutron Detectors." pp. 1904-1907.

Bellinger, S.L., et al., Mater. Res. Soc. Symp. Proc., vol. 1164 L06-01, (2009), "Improved Fabrication Technique for Microstructured Solid-State Neutron Detectors." (9 pages).

Bellinger, S.L., et al., IEEE Transactions Nuclear Science, vol. 56, No. 3, (Jun. 2009), "Characteristics of 3D Micro-Structured Semiconductor High Efficiency Neutron Detectors." pp. 742-746.

Bellinger, S.L., et al., IEEE Nuclear Science Symp., (Oct. 25-Oct. 31, 2009), "Variant Designs and Characteristics of Improved Microstructured Solid-State Neutron Detectors." pp. 986-989.

Bellinger, S.L., et al., Proc. Of SPIE, vol. 78050N (2010), "Characteristics of the Stacked Microstructured Solid-State Neutron Detector." (17 pages).

Bellinger, S.L., et al., Nuclear Instruments and Methods in Physics Research, A652 (2011), "Enhanced variant designs and characteristics of the microstructured solid-sate neutron detector." pp. 387-391.

Bellinger, S.L., Kansas State University, Ph.D. Dissertation (2011), "Advanced Microstructured Semiconductor Neutron Detectors Design, Fabrication, and Performance." pp. 1-237.

Bellinger, S.L., et al., Proc. SPIE—Int. Soc. Opt. Eng. 8373, No. 837301, (2012), "Characteristics of the Large-Area Stacked Microstructured Semiconductor Neutron Detector." (10 pages).

Bellinger, S.L., et al., IEEE Nuclear Science Symp., (2011), "Arrayed High Efficiency Dual Integrated Microstructured Semiconductor Neutron Detectors." pp. 1281-1284.

Bellinger, S.L., et al., IEEE Trans. Nuclear Science, vol. 59, No. 1, (Feb. 2012), "Improved High Efficiency Stacked Microstructured Neutron Detectors Backfilled With Nanoparticle 6LiF." pp. 167-173.

Bunch, S.C., et al., IEEE Nuclear Science Symp., N03-4 (2006), "PATARA Solid-State Neutron Detector Readout Electronics with Pole-Zero and Complex Shaping and Gated Baseline Restorer for the SNS." pp. 27-31.

Cooper, B.W., et al., IEEE Nuclear Science Symp. (2011), "Neutron Energy Spectrum with Microstructured Semiconductor Neutron Detectors." pp. 4783-4786.

De Lurgio, et al., Elsevier Science B.V. A505 (2003), "A neutron detector to monitor the intensity of transmitted neutrons for small-angle neutron scattering instruments." pp. 46-49.

Dunn, et al., Proc. 2nd Workshop on European Collaboration for Higher Education in Nuclear Engineering and Radiological Protection, Mar. 12-15, 2006, Valencia Spain, "Design and Performance of Portable Neutron Dosimeter." pp. 85-92.

Gersch, H.K., et al., IEEE Nuclear Science Symp., Lyon, France, Oct. 15-20, 2000, A Study of the Effect of Incremental Gamma-Ray Doses and Incremental Neutron Fluences Upon the Performance of Self-Biased, 10B-Coated High-Purity Epitaxial GaAs Thermal Neutron Detectors. pp. 42-46.

Gersch, H.K, et al., Elsevier Science B.V., Nuclear Instruments and Methods A489 (2002), The effect of incremental gamma-ray does and incremental neutron fluences upon the performance of self-biased 10B-Coated High-Purity Epitaxial GaAs Thermal Neutron Detectors. pp. 85-98.

Henderson, C.M., et al., Radiation Physics and Chemistry 79 (2010), "Characterization of Prototype Perforated Semiconductor Neutron Detectors." pp. 144-150.

Jahan, Q, et al., Nuclear Instruments and Methods, B263 (2007), "Neutron dosimeters employing high-efficiency perforated semiconductor detectors." pp. 183-185.

Klann, R.T., et al., 16th Int. Conf. on Applications of Accelerators in Research and Industry, Nov. 2000, Development of Semiconductor Detectors for Fast Neutron Radiography., pp. 1118-1121.

Klann, R.T., et al., 8th International Conf. on Nuc. Eng., Apr. 2-6, 2000, MD USA, "Development of Coated GaAs Neutron Detectors." pp. 1-6.

Klann, R.T., et al., 12th Biennial RPSD Topical Meeting, Santa Fe, NM, Apr. 14-18, 2002, Development of Coated Gallium-Arsenide for Neutron Detection Applications. (10 pages).

Lindsay, J.T., et al., Fifth World Conference on Neutron Radiography, Berlin, Germany, Jun. 17-20, 1996, "A Solid State, Position Sensitive GaAs Device as a Neutron Camera." pp. 240-248.

McGregor, D.S., et al., IEEE Nuclear Science Symp. San Francisco, CA, Oct. 21-28, 1995, "Semi-Insulating Bulk GaAs Thermal Neutron Imaging Arrays." pp. 1357-1364.

McGregor, D.S., et al. Nuclear Instruments and Methods, A380 (1996), Semi-insulating bulk GaAs as a semiconductor thermal-neutron imaging device. pp. 271-275.

McGregor, D.S., et al., IEEE Nuclear Science Symp., Seattle, WA, Oct. 25-29, 1999, "Self-Biased Boron-10 Coated High Purity Epitaxial GaAs Thermal Neutron Detectors." pp. 1364-1370.

(56) References Cited

OTHER PUBLICATIONS

McGregor, D.S., et al., 8th International Conference on Nuclear Engineering, Apr. 2-6, 2000, "Bulk GaAs-Based Neutron Detectors for Spent Fuel Analysis." pp. 1-8.

McGregor, D.S., et al., Journal of the Korean Association for Radiation Protection, 26 (2001), "Thin-Film-Coated Detectors for Neutron Detection." pp. 167-175.

McGregor, D.S., et al., Nuclear Instruments and Methods, A466 (2001), "Thin-film-coated bulk GaAs Detectors for thermal and fast neutron measurements." pp. 126-141.

McGregor, D.S., et al., IEEE Nuclear Science Symp., San Diego, CA, Nov. 4-9, 2001, "Design for Thin-Film-Coated Semiconductor Thermal Neutron Detectors." (5 pages).

McGregor, D.S., et al., IEEE Nuclear Science Symp., San Diego, CA, Nov. 4-9, 2001, "New Surface Morphology for Low Stress Thin-Film-Coated Thermal Neutron Detectors." pp. 2400-2405.

McGregor, D.S., et al., Proc. Of SPIE, vol. 4784 (2002), "Recent results From Thin-Film-Coated Semiconductor Neutron Detectors." pp. 164-182.

McGregor, D.S., et al., Nuclear Instruments and Methods A500, (2003), "Design considerations for thin film coated semiconductor thermal neutron detectors—I basics regarding alpha particle emitting neutron reactive films." pp. 272-308.

McGregor, D.S., et al., Radiation Physics and Chemistry 78, (2009), "Perforated diode neutron detector modules fabricated from high-purity silicon." pp. 874-881.

McGregor, D.S., et al., IEEE Nuclear Science Symp., Waikiki, Hawaii, Oct. 28-Nov. 3, 2007, "Wireless neutron and gamma ray detector modules for dosimetry and remote monitoring." pp. 807-811.

McGregor, D.S., et al., Proc. SPIE, 6706 (2007), "Perforated Semiconductor Neutron Detectors for Battery Operated Portable Modules." pp. 0N1-0N12.

McGregor, D.S., et al., IEEE Conference on Technologies for Homeland Security, May 16-17, 2007, "Perforated Semiconductor Neutron Detector Modules for Detection of Spontaneous Fission Neutrons." (7 pages).

McGregor, D.S., et al., IEEE Nuclear Science Symp., Oct. 19-25, 2008, "Micro-structured high-efficiency Semiconductor Neutron Detectors." pp. 445-448.

McGregor, D.S., et al., Nuclear Instruments and Methods in Physics Research, A608 (2009), "Microstructured semiconductor neutron detectors." pp. 125-131.

McGregor, D.S., et al., Radiation Physics and Chemistry, 78 (2009), "Perforated diode neutron detector modules bbricated from high-purity silicon." pp. 874-881.

McGregor, D.S., et al, Nuclear Instruments and Methods in Physics Research, A632 (2011), "Reporting detection efficiency for semiconductor neutron detectors A need for a standard." pp. 167-174.

Muminov, R.A., et al., Soviet Atomic Energy, 62 (1987), "High-Efficiency Semiconductor Thermal-Neutron Detectors." pp. 316-319.

McNeil, W.J., et al., IEEE Nuclear Science Symp., R08-2, Oct. 29-Nov. 3, 2006, "Development of Perforated Si Diodes for Neutron Detection." pp. 3731-3735.

McNeil, W.J., et al., IEEE Nuclear Science Symp. N51-4 (2007), "Preliminary Tests of a High Efficiency 1-D Silicon Pixel Array for Small Angle Neutron Scattering." pp. 2340-2342.

McNeil, W.J., et al., Nuclear Instruments and Methods in Physics Research, A604 (2009), "1-D array of perforated diode neutron detectors." pp. 127-129.

McNeil, W.J., et al., IEEE Nuclear Science Symp., Oct. 25-31, 2009, "1-D Array of Micro-Structured Neutron Detectors." pp. 2008-2011.

Sanders, J.D., et al., Conf. Rec. of IEEE Nuclear Science Symp., Nov. 4-9, 2001, "Development of GaAs-based neutron tomography system for the assay of nuclear fuel." pp. 2326-2329.

Schelten, J.M., et al., Physica B, 234-236 (1997), "A new Neutron Detector Development Based on Silicon Semiconductor and 6-LiF Converter." pp. 1084-1086.

Shultis, J.K., et al., IEEE Nuclear Science Symp., Oct. 18-22, 2004, "Efficiencies of Coated and Perforated Semiconductor Neutron Detectors." pp. 4568-4574.

\* cited by examiner

Oppositely facing devices in which the fingers of one device align with the trenches of another device allows for neutron reactive material to completely obscure the path of neutrons impinging perpendicular to the device planes.

HIGH-EFFICIENCY MICROSTRUCTURED SEMICONDUCTOR NEUTRON DETECTORS AND PROCESS TO FABRICATE HIGH-EFFICIENCY MICROSTRUCTURED SEMICONDUCTOR NEUTRON DETECTORS

CROSS-REFERENCE TO RELATED APPLICATION

This application claims the benefit of U.S. provisional application Ser. No. 62/191,374 filed Jul. 11, 2015.

STATEMENT REGARDING FEDERALLY SPONSORED RESEARCH OR DEVELOPMENT

The invention was made with Government support under Contract No. HDTRA1-14C-0032 from the U.S. Department of Defense (DoD) Defense Threat Reduction Agency. The Government has certain rights to this invention.

TECHNICAL FIELD

This invention relates to neutron detectors, methods of making the same, and in particular, to high-efficiency neutron detectors and methods of making the same.

Overview

Semiconductor detectors coated with neutron-reactive materials offer an alternative approach to scintillator-based neutron imaging devices for neutron radiography (normally scintillating screens coupled to photographic film or to other photo-recording devices). Neutron-reactive-film-coated devices investigated in previous works include Si, SiC, GaAs, and diamond detectors, all of which have advantages and disadvantages.

The converter films attached to semiconductor devices most often used for neutron detection utilize either the $^6$Li(n,α)$^3$H reaction or the $^{10}$B(n,α)$^7$Li reaction. Due to low chemical reactivity, the most common materials used are pure $^{10}$B and $^6$LiF. Neutron reactive films based on the $^{157}$Gd(n,γ)$^{158}$Gd reaction show a higher neutron absorption efficiency than $^{10}$B(n,α)$^7$Li and $^6$Li(n,α)$^3$H-based films, however the combined emission of low energy gamma rays and conversion electrons from $^{157}$Gd(n,γ)$^{158}$Gd reactions make neutron-induced events difficult to discriminate from background gamma-ray events. As a result, Gd-based films are less attractive for devices where background gamma ray contamination is a problem. Alternatively, the particle energies emitted from the $^6$Li(n,α)$^3$H and the $^{10}$B(n,α)$^7$Li reactions are relatively large and produce signals easily discernable from background gamma ray noise. Thus far, thermal neutron detection efficiencies have been limited to only 4% for $^6$LiF and $^{10}$B single-coated devices. Described in the following document is a new device design that will yield thermal neutron detection efficiencies twenty times greater than present designs (over 70%) while remaining no thicker than one mm. Hence, the device is compact, rugged, and highly efficient.

Expected Efficiency of Conventional $^{10}$B and $^6$Li Coated Detectors

The $^{10}$B(n,α)$^7$Li reaction leads to the following reaction products:

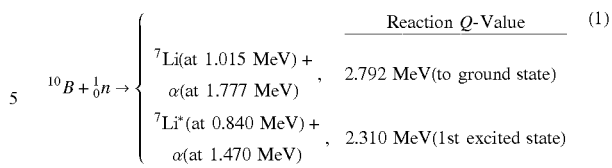

which are released in opposite directions when thermal neutrons (0.0259 eV) are absorbed by $^{10}$B. After absorption, 94% of the reactions leave the $^7$Li ion in its first excited state, which rapidly de-excites to the ground state (~$10^{-13}$ seconds) by releasing a 480 keV gamma ray. The remaining 6% of the reactions result in the $^7$Li ion dropping directly to its ground state. The microscopic thermal neutron absorption cross section is 3840 barns. Additionally, the microscopic thermal neutron absorption cross section decreases with increasing neutron energy, with a dependence proportional to the inverse of the neutron velocity (1/v) over much of the energy range.

The $^6$Li(n,α)$^3$H reaction leads to the following products:

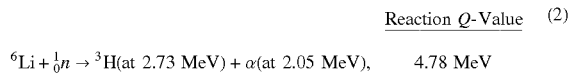

which again are oppositely directed if the neutron energy is sufficiently small. The microscopic thermal neutron (0.0259 eV) absorption cross section is 940 barns. The thermal neutron absorption cross section also demonstrates a 1/v dependence, except at a salient resonance above 100 keV, in which the absorption cross section surpasses that of $^{10}$B for energies between approximately 150 keV to 300 keV. Additional resonances characteristic to either isotope cause the absorption cross section to surpass one or the other as the neutron energy increases. Due to its higher absorption cross section, the $^{10}$B(n,α)$^7$Li reaction leads to a generally higher reaction probability than the $^6$Li(n,α)$^3$H reaction for neutron energies below 100 keV. However, the higher energy reaction products emitted from the $^6$Li(n,α)$^3$H reaction lead to greater ease of detection than the particles emitted from the $^{10}$B(n,α)$^7$Li reaction.

The term "effective range" (denoted L) is the distance through which a particle may travel within the neutron reactive film before its energy decreases below the set minimum detectable threshold, or rather, before its energy decreases below the electronic lower level discriminator (LLD) setting. The term does not take into account additional energy losses from contact "dead regions". The neutron-induced reaction products released do not have equal masses, and therefore do not have equal energies or effective ranges. Neutrons may interact anywhere within the reactive film, and the reaction products lose energy as they move through the neutron reactive film. Reaction product self-absorption reduces the energy transferred to the semiconductor detector, and ultimately limits the maximum film thickness that can be deposited over the semiconductor device. The measured voltage signal is directly proportional to the number of electron-hole pairs excited within the semiconductor. Reaction products that deposit most or all of their energy in the detector will produce much larger voltage signals than those reaction products that lose most of their energy before reaching the detector.

The energy absorbed in the detector is simply the original particle energy minus the combined energy lost in the boron film and the detector contact during transit. At any reaction location within the reactive film, a reduced energy will be retained by either particle that should enter the detector, being the maximum possible if the trajectory is orthogonal to the device contact. Hence, if the interaction occurs in the $^{10}$B film at a distance of 0.5 μm away from the detector, the maximum energy retained by the $^7$Li ion when it enters the detector will be 430 keV, and the maximum energy retained by the alpha particle will be 1150 keV. For the same interaction distance of 0.5 μm from the detector, the energy retained by the particle when it reaches the detector decreases as the angle increases from orthogonal (>0°). Given a predetermined minimum detection threshold (or LLD setting), the effective range (L) for either particle can be determined. For instance, an LLD setting of 300 keV yields $L_{Li}$ as 0.810 microns and $L_\alpha$ as 2.648 microns. Similar conditions exist for $^6$LiF and $^6$Li films.

A commonly-used geometry involves the use of a planar semiconductor detector diode over which a neutron reactive film has been deposited. Assuming that the neutron beam is perpendicular to the detector front contact, the sensitivity contribution for a reaction product species can be found by integrating the product of the neutron interaction probability and the fractional solid angle, defined by the reaction product effective ranges subtending the device interface, which yields:

$$S_p(D_F) = 0.5 F_p \left\{ \left(1 + \frac{1}{\Sigma_F L}\right)(1 - e^{-\Sigma_F D_F}) - \frac{D_F}{L} \right\} \text{ for } D \leq L, \quad (1A)$$

and $$S_p(D_F) = 0.5 F_p \, e^{-\Sigma_F(D_F - L)} \left\{ \left(1 + \frac{1}{\Sigma_F L}\right)(1 - e^{-\Sigma_F L}) - 1 \right\} \text{ for } D_F > L, \quad (1B)$$

where $\Sigma_F$ is the macroscopic neutron absorption cross section, $D_F$ is the film thickness, and $F_p$ is the branching ratio of the reaction product emissions. The total sensitivity accordingly can be found by adding all of the reaction product sensitivities $$S(D_F)|_{Total} = \sum_{p=1}^{N} S_p(D_F), \quad (2)$$

where N is the number of different reaction product emissions. In the case of $^{10}$B-based films, N equals 4. Notice from equation 1B that the value of $S_p$ reduces as $D_F$ becomes larger than the value of L. As a result of this, there will be an optimum neutron reactive film thickness for front-irradiated detectors. Since the minimum particle detection threshold determines the effective range (L), the optimum film thickness is also a function of the LLD setting. With the LLD set at 300 keV, the maximum achievable thermal neutron detection efficiency is 3.95%. The thermal neutron detection efficiency can be increased to 4.8% by lowering the LLD setting, but only at the expense of accepting more system noise and gamma-ray background interference. Similar cases exist for $^6$LiF and pure $^6$Li films. Using an LLD setting of 300 keV, obverse detector irradiation yields maximum thermal neutron detection efficiencies of 4.3% for $^6$LiF-coated devices and 11.6% for pure $^6$Li-coated devices (see FIGS. 2 and 3).

Increasing the efficiency can be achieved by intimately attaching two coated devices such that they are either facing each other or facing away from each other. The design does not rely on the full depletion of the detectors and can be operated with modest operating voltages. The most straightforward method for producing such a device is to simply fasten two front-coated devices together. If the neutron reactive film thickness is thin, coincident charged particle emissions from a single neutron absorption event can be measured simultaneously by both detectors if operated individually, thus giving rise to the erroneous recording of two neutron interaction events when only one actually occurred. Erroneous "double counts" can be eliminated by connecting both devices to a single preamplifier, in which a single event always registers as only one count on the preamplifier circuit.

In recent years, a method to improve efficiency has been introduced where microstructured features are etched into the semiconductor substrate, and those features are back-filled with neutron reactive materials. Yet, because portions of the substrate do not have etched features, neutrons can stream through such regions and will not be absorbed or detected. Methods to reduce streaming have been introduced, which includes fastening two or more microstructured detectors together such that the trenches of one detector are aligned with the non-etched feature of another, thereby, significantly reducing neutron streaming. However, alignment of two of more microstructured detectors is tedious and requires careful alignment in the x-direction, y-direction and angle theta. Misalignment causes a reduction in efficiency.

Another method introduced to reduce streaming is to produce etched patterns out of sinusoidal or chevron patterns. Streaming still occurs and the patterns are expensive and difficult to etch. Etching is performed with reactive dry etching methods, which is generally expensive to perform with relatively slow throughput.

Although both of these techniques, stacking and serpentine patterns, work to reduce the streaming problem and increase neutron detection efficiency, they are both labor intensive and expensive to produce. Described here is a new invention that allows for high efficiency non-streaming semiconductor neutron detectors. These detectors can be fabricated with a batch production process.

Muminov and Tsvang [1987] briefly discussed the possibility of producing a microstructured device etch from both sides in which the bottom etched side was "displaced relative to the channels at the top by the width of the silicon interlayer", hereby, reducing the neutron streaming problem. However, Muminov and Tsvang did not pursue the concept, nor report a reduction to practice. A double-sided microstructured semiconductor neutron detector (DS-MSND) is difficult to fabricate, and such devices have not been realized until the present disclosure of this invention.

Bean, K. E., "Anisotropic Etching of Si," IEEE Trans. Electron Dev., ED-25 (1978) 1185.

Bellinger, S. L., W. J. McNeil, T. C. Unruh, D. S. McGregor, "Angular Response of Perforated Silicon Diode High Efficiency Neutron Detectors," IEEE Nuclear Science Symposium, Waikiki, Hi., Oct. 28-Nov. 3, 2007.

Bellinger, S. L., W. J. McNeil and D. S. McGregor, "Improved Fabrication Technique for Microstructured Solid-State Neutron Detectors," Proc. MRS, vol. 1164 (2009) L06-01.

Bellinger, S. L., W. J. McNeil, T. C. Unruh, D. S. McGregor, "Characteristics of 3D Micro-Structured Semiconductor High Efficiency Neutron Detectors," IEEE Trans. Nucl. Sci., NS-56 (2009) pp. 742-746.

Bellinger, S. L., W. J. McNeil, D. S. McGregor, "Variant Designs and Characteristics of Improved Microstructured Solid-State Neutron Detectors," IEEE Nuclear Science Symposium, Orlando, Fla., Oct. 25-Oct. 31, 2009, pp. 986-989.

Bellinger, S. L., R. G. Fronk, W. J. McNeil, J. K. Shultis, T. J. Sobering, D. S. McGregor, "Characteristics of the Stacked Microstructured Solid-State Neutron Detector," Proc. SPIE, 7805 (2010) 7805-0N.

Bellinger, S. L., R. G. Fronk, W. J. McNeil, T. J. Sobering, and D. S. McGregor, "Enhanced Variant Designs and Characteristics of the Microstructured Solid-State Neutron Detector," Nucl. Instrum. and Meth., A 652 (2011) pp. 387-391.

Bellinger, S. L., Advanced Microstructured Semiconductor Neutron Detectors: Design, Fabrication, and Performance, Ph.D. Dissertation, Kansas State University, Manhattan, Kans. (2011).

Bellinger, S. L., R. G. Fronk, T. J. Sobering, D. S. McGregor, "Characteristics of the Large-Area Stacked Microstructured Semiconductor Neutron Detector," Proc. SPIE—Int. Soc. Opt. Eng., 8373, no. 837301, pp. 1-10, 2012.

Bellinger, S. L., R. G. Fronk, T. J. Sobering, D. S. McGregor, "Arrayed High Efficiency Duel-Integrated Microstructured Semiconductor Neutron Detectors," Applied Radiation and Isotopes, 70 (2012) pp. 1121-1124.

Bellinger, S. L., R. G. Fronk, W. J. McNeil, T. J. Sobering, D. S. McGregor, "Improved High Efficiency Stacked Microstructured Neutron Detectors Backfilled With Nanoparticle $^6$LiF," IEEE Trans. Nuclear Science, 59 (2012) pp. 167-173.

Bellinger, S. L., R. G. Fronk, and D. S. McGregor, "Method of Fabricating a Neutron Detector such as a Microstructured Semiconductor Neutron Detector," U.S. Pat. No. 8,778,715; allowed Jul. 15, 2014.

Bunch, S., J. L., Britton, B. J. Blalock, C. L. Britton, D. S. McGregor, R. Taylor, T. Sobering, D. Huddleston, W. McNeil, T. Unruh, B. B. Rice, S. Bellinger, B. Cooper, L. Crow, "HENDA and Patara: A Solid State Neutron Detector and a Prototype Readout Chip for the SNS", VIth International Meeting on Front End Electronics for High Energy, Nuclear, Medical and Space Applications, 17-20 May 2006, Perugia, Italy.

Cooper, B. W., S. L. Bellinger, A. Caruso, R. G. Fronk, W. H. Miller, T. M. Oakes, J. K. Shultis, T. J. Sobering, D. S. McGregor, "Neutron Energy Spectrum with Micro-structured Semiconductor Neutron Detectors," IEEE NSS Conf. Rec., Valencia, Spain, Oct. 23-29, 2011.

De Lurgio, P. M., R. T. Klann, C. L. Fink, D. S. McGregor, P. Thiyagaraj an, I. Naday, "A Neutron Detector to Monitor the Intensity of Transmitted Neutrons for Small-Angle Neutron Scattering Instruments," Nuclear Instruments and Methods, A505 (2003) pp. 46-49.

Dunn, W. L., Q. M. Jahan, D. S. McGregor, W. McNeil, E. L. Patterson, B. Rice, J. K. Shultis, C. J. Solomon, Design and Performance of a Portable Neutron Dosimeter, *Proc. 2nd Workshop on European Collaboration for Higher Education in Nuclear Engineering and Radiological Protection*, 12-15 March, 2006, Valencia, Spain, pp. 85-92.

Gersch, H. K., D. S. McGregor, and P. A. Simpson, "A Study of the Effect of Incremental Gamma-Ray Doses and Incremental Neutron Fluences Upon the Performance of Self-Biased $^{10}$B-Coated High-Purity Epitaxial GaAs Thermal Neutron Detectors," Conference Record of the IEEE Nuclear Science Symposium, Lyon, France, Oct. 15-20, 2000.

Gersch, H. K., D. S. McGregor, and P. A. Simpson, "A Study of the Effect of Incremental Gamma-Ray Doses and Incremental Neutron Fluences Upon the Performance of Self-Biased $^{10}$B-Coated High-Purity Epitaxial GaAs Thermal Neutron Detectors," Nuclear Instruments and Methods, A489 (2002) pp. 85-98.

Henderson, C. M., Q. M. Jahan, W. L. Dunn, J. K. Shultis and D. S. McGregor, "Characterization of Prototype Perforated Semiconductor Neutron Detectors," Radiation Physics and Chemistry, 79 (2010) pp. 144-150.

Jahan, Q., E. Patterson, B. Rice, W. L. Dunn and D. S. McGregor, "Neutron Dosimeters Employing High-efficiency Perforated Semiconductor Detectors," Nuc. Instrum. and Meth., B263 (2007) pp. 183-185.

Klann, R. T., C. L. Fink, D. S. McGregor, and H. K. Gersch, "Development of Semi-Conductor Detectors for Fast Neutron Radiography," Conference Record of the 15th Int. Conf. on Applications of Accelerators in Research and Industry, November, 2000.

Klann, R. T., and D. S. McGregor, "Development of Coated GaAs Neutron Detectors," Conference Record of ICONE-8, 8th International Conference on Nuclear Engineering, Apr. 2-6, 2000, Baltimore, Md. USA.

Klann, R. T., Charles L. Fink, Douglas S. McGregor, and Holly K. Gersch, "Development of Coated Gallium-Arsenide for Neutron Detection Applications," Conference Record of the 12$^{th}$ Biennial RPSD Topical Meeting, Sante Fe, N. Mex., Apr. 14-18, 2002.

Lindsay, J. T., C. C. Brannon, D. S. McGregor, and R. W. Olsen, "A Solid State, Position Sensitive GaAs Device as a Neutron Camera," Fifth World Conference on Neutron Radiography, Berlin, Germany, Jun. 17-20, 1996, pp. 240-248.

McGregor, D. S., J. T. Lindsay, C. C. Brannon, and R. W. Olsen, "Semi-Insulating Bulk GaAs Thermal Neutron Imaging Arrays," Conference Record of the IEEE Nuclear Science Symposium, San Francisco, Calif., Oct. 21-28, 1995, pp. 395-399.

McGregor, D. S., J. T. Lindsay, C. C. Brannon, and R. W. Olsen, "Semi-Insulating Bulk GaAs as a Semiconductor Thermal-Neutron Imaging Device," Nuclear Instruments and Methods, A380 (1996a) pp. 271-275.

McGregor, D. S., J. T. Lindsay, C. C. Brannon, and R. W. Olsen, "Semi-Insulating Bulk GaAs Thermal Neutron Imaging Arrays," IEEE Trans. Nuclear Science, 43 (1996b) pp. 1358-1364.

McGregor, D. S., S. M. Vernon, H. K. Gersch and D. K. Wehe, "Self-Biased Boron-10 Coated High Purity Epitaxial GaAs Thermal Neutron Detectors," Conference Record of IEEE Nuclear Science Symposium, Seattle, Wash., Oct. 25-29, 1999.

McGregor, D. S., S. M. Vernon, H. K. Gersch, S. M. Markham, S. J. Wojtczuk and D. K. Wehe, "Self-Biased Boron-10 Coated High Purity Epitaxial GaAs Thermal Neutron Detectors," IEEE Trans. Nuclear Science, NS-47 (2000a) pp. 1364-1370.

McGregor, D. S., J. T. Lindsay, Y-H. Yang, and J. C. Lee, "Bulk GaAs-Based Neutron Detectors for Spent Fuel Analysis," Conference Record of ICONE-8, 8th International Conference on Nuclear Engineering, Apr. 2-6, 2000b, Baltimore, Md. USA.

McGregor, D. S., H. K. Gersch, J. D. Sanders, R. T. Klann, and J. T. Lindsay, "Thin-Film-Coated Detectors for Neutron Detection," Journal of the Korean Association for Radiation Protection, 26 (2001a) pp. 167-175.

McGregor, D. S., R. T. Klann, H. K. Gersch, and Y-H. Yang, "Thin-Film-Coated Bulk GaAs Detectors for Thermal and Fast Neutron Measurements," Nuclear Instruments and Methods, A466 (2001b) pp. 126-141.

McGregor, D. S., H. K. Gersch, J. D. Sanders, and R. T. Klann, "Designs for Thin-Film-Coated Semiconductor Neutron Detectors," Conference Record of the IEEE Nuclear Science Symposium, San Diego, Calif., Nov. 4-9, 2001c.

McGregor, D. S., R. T. Klann, H. K. Gersch, E. Ariesanti, J. D. Sanders, and B. VanDerElzen, "New Surface Morphology for Low Stress Thin-Film-Coated Thermal Neutron Detectors," Conference Record of the IEEE Nuclear Science Symposium, San Diego, Calif., Nov. 4-9, 2001d.

McGregor, D. S., H. K. Gersch, J. D. Sanders, R. T. Klann, and J. T. Lindsay, "Thin-Film-Coated Detectors for Neutron Detection," Conference Record of the First iTRS International Symposium On Radiation Safety and Detection Technology, Seoul, Korea, Jul. 18-19, 2001e.

McGregor, D. S., R. T. Klann, H. K. Gersch, E. Ariesanti, J. D. Sanders, and B. VanDerElzen, "New Surface Morphology for Low Stress Thin-Film-Coated Thermal Neutron Detectors," IEEE Trans. Nuclear Science, NS-49 (2002a) pg. 1999-2004.

McGregor, D. S., R. T. Klann, J. D. Sanders, J. T. Lindsay, K. J. Linden, H. K. Gersch, P. M. De Lurgio, C. L. Fink, and Elsa Ariesanti, "Recent Results From Thin-Film-Coated Semiconductor Neutron Detectors," Proc. of SPIE, Vol. 4784 (2002b) pp. 164-182.

McGregor, D. S., M. D. Hammig, H. K. Gersch, Y-H. Yang, and R. T. Klann, "Design Considerations for Thin Film Coated Semiconductor Thermal Neutron Detectors, Part I: Basics Regarding Alpha Particle Emitting Neutron Reactive Films," Nuclear Instruments and Methods, A500 (2003a) pp. 272-308.

McGregor, D. S., and R. T. Klann, "Pocked Surface Neutron Detector," U.S. Pat. No. 6,545,281; allowed Apr. 8, 2003b.

McGregor, D. S., et al., "Perforated Semiconductor Diodes for High Efficiency Solid State Neutron Detectors," presentation recorded in the conference record of the Workshop on Use of Monte Carlo Techniques for Design and Analysis of Radiation Detectors, Coimbra, Portugal, Sep. 15-17, 2006.

McGregor, D. S., and R. T. Klann, "High-Efficiency Neutron Detectors and Methods of Making the Same," U.S. Pat. No. 7,164,138; allowed Jan. 16, 2007a.

McGregor, D. S., S. L. Bellinger, D. Bruno, S. Cowley, W. L. Dunn, M. Elazegui, W. J. McNeil, H. Oyenan, E. Patterson, J. K. Shultis, G. Singh, C. J. Solomon, A. Kargar, T. Unruh, "Wireless Neutron and Gamma Ray Detector Modules for Dosimetry and Remote Monitoring," IEEE Nuclear Science Symposium, Waikiki, Hi., Oct. 28-Nov. 3, 2007b.

McGregor, D. S., S. L. Bellinger, D. Bruno, W. J. McNeil, E. Patterson, J. K. Shultis, C. J. Solomon, T. Unruh, "Perforated Semiconductor Neutron Detectors for Battery Operated Portable Modules," Proc. SPIE, 6706 (2007c) pp. 0N1-0N12.

McGregor, D. S., S. L. Bellinger, D. Bruno, S. Cowley, M. Elazegui, W. J. McNeil, E. Patterson, B. B. Rice, C. J. Solomon, J. K. Shultis, and T. Unruh, "Perforated Semiconductor Neutron Detector Modules for Detection of Spontaneous Fission Neutrons," IEEE Conference on Technologies for Homeland Security, Woburn, Mass., May 16-17, 2007d.

McGregor, D. S., S. Bellinger, D. Bruno, W. J. McNeil, E. Patterson, B. B. Rice, "Perforated Semiconductor Neutron Detector Modules," Proc. of 32nd Annual GOMACTech Conf., Lake Buena Vista, Fla., Mar. 19-22, 2007e.

McGregor, D. S., S. L. Bellinger, W. J. McNeil, T. C. Unruh, "Micro-Structured High-Efficiency Semiconductor Neutron Detectors," IEEE Nuclear Science Symposium, Dresden, Germany, Oct. 19-Oct. 25, 2008.

McGregor, D. S., W. J. McNeil, S. L. Bellinger, T. C. Unruh, J. K. Shultis, "Microstructured Semiconductor Neutron Detectors," Nucl. Instrum. and Meth. A608 (2009a) pp. 125-131.

McGregor, D. S., S. Bellinger, D. Bruno, W. L. Dunn, W. J. McNeil, E. Patterson, B. B. Rice, J. K. Shultis, T. Unruh, "Perforated Diode Neutron Detector Modules Fabricated from High-Purity Silicon," Radiation Physics and Chemistry, 78 (2009b) pp. 874-881.

McGregor, D. S., S. L. Bellinger, W. J. McNeil, E. L. Patterson, B. B. Rice, J. K. Shultis, C. J. Solomon, "Non-Streaming High-Efficiency Perforated Semiconductor Neutron Detectors and Method of Making the Same," U.S. Pat. No. 7,855,372; allowed Dec. 21, 2010.

McGregor, D. S., J. K. Shultis, "Reporting Detection Efficiency for Semiconductor Neutron Detectors; a Need for a Standard," Nucl. Instrum. and Meth., A632 (2011) pp. 167-174.

Muminov, R. A., and L. D. Tsvang, "High-Efficiency Semiconductor Thermal-Neutron Detectors," Soviet Atomic Energy, 62 (1987) 316-319.

McNeil, W. J., S. Bellinger, T. Unruh, E. Patterson, A. Egley, D. Bruno, M. Elazegui, A. Streit, D. S. McGregor, "Development of Perforated Si Diodes for Neutron Detection," IEEE Nuclear Science Symposium, San Diego, Calif., Oct. 29-Nov. 3, 2006.

McNeil, W. J., S. L. Bellinger, B. J. Blalock, C. L. Britton Jr., J. L. Britton, S. C. Bunch, W. L. Dunn, C. M. Henderson, T. J. Sobering, R. D. Taylor, T. C. Unruh, D. S. McGregor, "Preliminary Tests of a High Efficiency 1-D Silicon Pixel Array for Small Angle Neutron Scattering," IEEE Nuclear Science Symposium, Waikiki, Hi., Oct. 28-Nov. 3, 2007.

McNeil, W. J., S. L. Bellinger, T. C. Unruh, C. M. Henderson, P. Ugorowski, B. Morris-Lee, R. D. Taylor, D. S. McGregor, "1-D Array of Perforated Diode Neutron Detectors," Nucl. Instrum. Meth., A604 (2009) pp. 127-129.

McNeil, W. J., S. L. Bellinger, T. C. Unruh, C. M. Henderson, P. B. Ugorowski, W. L. Dunn, R. D. Taylor, B. J. Blalock, C. L. Britton, D. S. McGregor, "1024-Channel Solid State 1-D Pixel Array for Small Angle Neutron Scattering," IEEE Nuclear Science Symposium, Orlando, Fla., Oct. 25-Oct. 31, 2009, pp. 2008-2011.

Sanders, J. D., J. T. Lindsay, and D. S. McGregor, "Development of a GaAs-Based Neutron Tomography System for the Assay of Nuclear Fuel," Conference Record of the IEEE Nuclear Science Symposium, San Diego, Calif., Nov. 4-9, 2001.

Schelten, J., M. Balzhauser, F. Hongesberg, R. Engels, and R. Reinartz, "A New Detector Development Based on Silicon Semiconductor and $^6$LiF Converter," Physica B, 234-236 (1997) pp. 1084-1086.

Schelten, J., R. Reinatz, "Neutron Detector," U.S. Pat. No. 5,880,471A, allowed Mar. 9, 1999.

Shultis, J. K., and D. S. McGregor, "Efficiencies of Coated and Perforated Semiconductor Neutron Detectors," Conf. Rec. IEEE Nuclear Science Symposium, Rome, Italy, Oct. 18-22, 2004.

Shultis, J. K., and D. S. McGregor, "Efficiencies of Coated and Perforated Semiconductor Neutron Detectors," IEEE Trans. Nuclear Science, NS-53 (2006) pp. 1659-1665.

Shultis, J. K., and D. S. McGregor, "Designs for Micro-Structured Semiconductor Neutron Detectors," Proc. SPIE, Vol. 7079 (2008) pp. 06:1-06:15.

Shultis, J. K., and D. S. McGregor, "Design and Performance Considerations for Perforated Semiconductor Thermal-Neutron Detectors," Nuclear Instruments and Methods, A606 (2009) pp. 608-636.

Solomon, C. J., J. K. Shultis, W. J. McNeil, T. C. Unruh, B. B. Rice, and D. S. McGregor, "A Hybrid Method for Coupled Neutron-Ion Transport Calculations for $^{10}$B and $^{6}$LiF Coated and Perforated Detector Efficiencies," Nucl. Instrum. and Meth., A580 (2007) pp. 326-330.

Solomon, C. J., J. K. Shultis, D. S. McGregor, "Angular Efficiency Design Considerations for Perforated Semiconductor Neutron Detectors," IEEE Nuclear Science Symposium, Waikiki, Hi., Oct. 28-Nov. 3, 2007.

Solomon, C. J., J. K. Shultis, D. S. McGregor, "Reduced Efficiency Variation in Perforated Neutron Detectors with Sinusoidal Trench Design," Nucl. Instrum. and Meth., A618 (2010) pp. 260-265.

Unruh, T. C., S. L. Bellinger, D. E. Huddleston, W. J. McNeil, E. Patterson, T. Sobering, R. D. Taylor, D. S. McGregor, "Design and Operation of a 2D Thin Film Semiconductor Neutron Detector Array for use as a Beamport Monitor," Nucl. Instrum. Meth., A604 (2009) pp. 150-153.

SUMMARY OF EXAMPLE EMBODIMENTS

At least one embodiment of the present invention provides a unique semiconductor neutron detector design and process to build a semiconductor neutron detector in which a double-sided microstructured semiconductor neutron detector with high neutron detection efficiency, good charge collection, low neutron streaming, and low electrical leakage current is produced.

Further, at least one embodiment of the present invention provides a semiconductor neutron detector design and process to build a semiconductor neutron detector in which a neutron reactive material is backfilled into cavities and the performance of the device is enhanced.

Further, at least one embodiment of the present invention provides a semiconductor neutron detector design and process to build a semiconductor neutron detector in which the detector requires no applied bias to operate, or the detector requires substantially minimal voltage to operate.

In order to make the aforementioned and other objects, features and advantages of the present invention comprehensible, descriptions of preferred embodiments accompanied with figures are described in detail below.

Other objects of the invention will be apparent from the following description and drawings.

Discussions of the production of microstructured semiconductor neutron detectors are found in Muminov et al. [1987], and Schelten et al. [1997, 1999]; however neither research group reported a working device reduced into practice. The first such working devices, microstructured semiconductor neutron detectors, hereafter named 'MSND', were reported by McGregor et al. [2001d, 2002a]. These detectors were made with tiny holes etched upon a single surface of a semiconducting GaAs substrate, with the holes backfilled with $^{10}$B nanopowder. The reported intrinsic thermal neutron detection efficiency [defined in McGregor et al., 2011] was 3.3% [McGregor et al., 2002a]. The construction of a MSND requires a semiconductor material, features etched into that semiconductor, and a neutron reactive material such as boron or boron compounds, or lithium, or lithium compounds backfilled into the etched features. As depicted in FIG. 1, neutrons can stream directly through a standard single-sided MSND, never encountering neutron reactive material.

Alternative geometries were explored to increase the intrinsic thermal neutron detection efficiency, which included serpentine trench patterns, straight trenches, semiconductor columns, various hole formations and devices etched from both sides. The prior art of McGregor [2007a] describes a method of improving the neutron detection efficiency by offset stacking of two single-sided MSNDs, as depicted in FIGS. 2 and 3. The method works and delivers high efficiency, as reported by Bellinger et al. [2010], yet the design is prone to misalignment, thereby, reducing the overall intrinsic thermal neutron detection efficiency. The prior art of McGregor [2007a] describes a double-sided MSND design of FIGS. 4 and 5 that reduces charge carrier collection time. The design has trenches etched from both sides, offset and interspersed, but still allows for neutron streaming through semiconductor regions which have no neutron-reactive absorber. These problems with neutron streaming and reduced efficiency are solved by developing MSNDs etched from both sides were the features are offset, but not interspersed, such that neutrons have a high probability of intersecting neutron-reactive material when passing through the MSND.

A top view of such a double-sided MSND, or DS-MSND, is shown in FIG. 6. An isometric side view of such a DS-MSND is shown in FIG. 7. The important feature of eliminating neutron streaming with a DS-MSND is shown in FIG. 8, where neutrons 10 that pass through the semiconductor material 2 of the upper MSND structure intersect the neutron absorber 3 of the lower MSND structure. The design of etching features into a semiconductor on both sides, subsequently backfilled with neutron reactive material, as described by Muminov et al. [1987] simply does not work due to excessive leakage currents and inadequate depletion of the semiconductor volume. Instead, a semiconductor diode structure with electrical contacts must be fabricated on or about the semiconductor etched features on both sides of the DS-MSND. These etched features can be straight trenches, curved trenches, sinusoidal trenches, holes arranged in various patterns such as square and hexagonal patterns, and columns arranged is various patterns such as square and hexagonal patterns. The neutron reactive materials can be boron or boron compounds, lithium or lithium compounds, gadolinium or gadolinium compounds, uranium, thorium, plutonium, and hydrogenous materials such as polyethylene. The unique design and method of off-set patterning and etching of a semiconductor wafer with very large scale integration (VLSI) technology and manufacturing a fully active volume diode are described.

DS-MSNDs are fabricated utilizing standard VLSI processes and techniques. DS-MSND diodes are fabricated from 100-mm, 8 kΩ-cm to 30 kΩ-cm resistivity, [110]-oriented silicon wafers, with a primary flat cut and aligned on the (111) plane. DS-MSNDs are patterned on 500-μm and 1,000-μm thick silicon wafers. Oxidized silicon wafers are patterned with a straight-trench pattern using AZ1512 positive photoresist, with trenches 20-μm wide and a 30-μm to 40-μm patterned pitch. The backside trench pattern is azimuthally aligned and laterally offset aligned to the topside trench pattern. The oxide in the patterned areas is removed with a 6:1 BOE etch process. The trench pattern photoresist is removed and a diffusion window pattern is aligned over the trench areas on both sides of the wafer. The diffusion window oxide is partially removed with 6:1 BOE etch process, such that the trench oxide is completely removed.

The silicon wafer is then etched in an aqueous 50% w/v KOH bath at 52° C. for 10 to 20 hours to depths of 175-μm to 450-μm, rinsed, and cleaned with a standard RCA process. Blocking contacts were formed on the top and bottom of the wafer using a solid-source diffusion furnace. A p-type or n-type contact is diffused on the topside and bottomside microstructures, depending on desired DS-MSND diode-structure type. With these contacts formed on high-resistivity silicon, a junction is produced that allows for the entire device to be depleted with minimal leakage current. Following diffusion drive-in, the wafer is loaded into an electron-beam evaporator where a Ti/Au contact is deposited on the top and bottom-side diffusion windows. Both the top- and bottom-side trenches with nanoparticle $^6$LiF neutron conversion material via a centrifugal backfilling process. The wafer is then diced into individual 1-cm$^2$ active-area diodes and tested for their electrical characteristics. Diodes typically yield less than 5-nA cm$^{-2}$ of leakage current and less than 100-pF cm$^{-2}$ capacitance at the operational bias of −3 V.

Described here are preferred embodiments of such DS-MSND structures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention will now be described more specifically with reference to the following embodiments. It is to be noted that the following descriptions of preferred embodiments of this invention are presented herein for the purpose of illustration and description only. It is not intended to be exhaustive or to be limited to the precise form disclosed.

Figure 1:
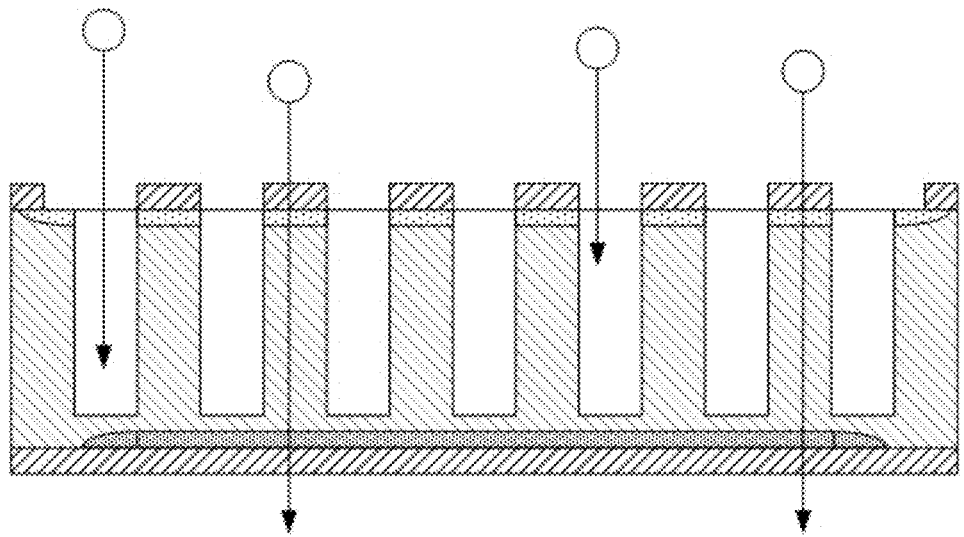
FIG. 1 is a Single-Sided Microstructured Semiconductor Neutron Detector of prior art, showing the problem with neutrons streaming through the detector without detection.
Figure 2:
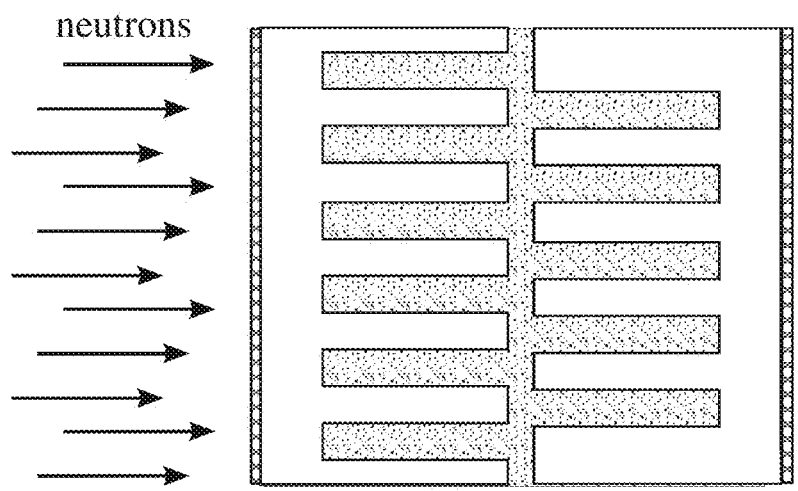
FIG. 2 shows two Single-Sided Microstructured Semiconductor Neutron Detector of prior art, inwardly stacked to reduce the problem of neutrons streaming through the detector without detection.
Figure 3:
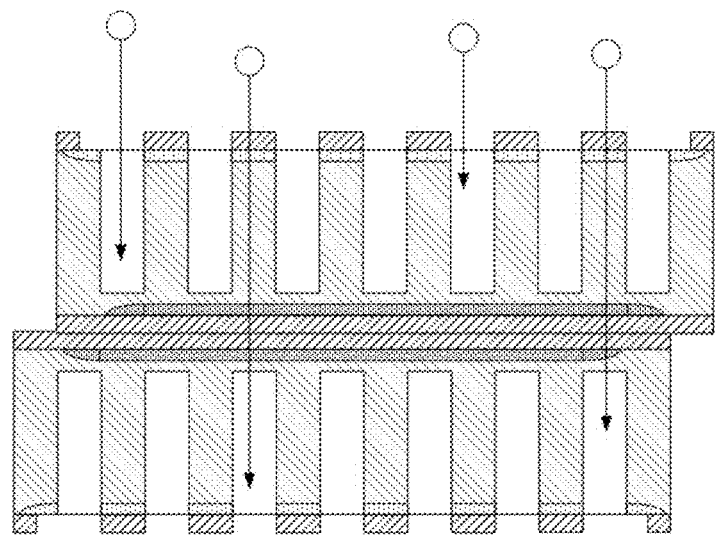
FIG. 3 shows two Single-Sided Microstructured Semiconductor Neutron Detector of prior art, outwardly stacked to reduce the problem of neutrons streaming through the detector without detection.
Figure 4:
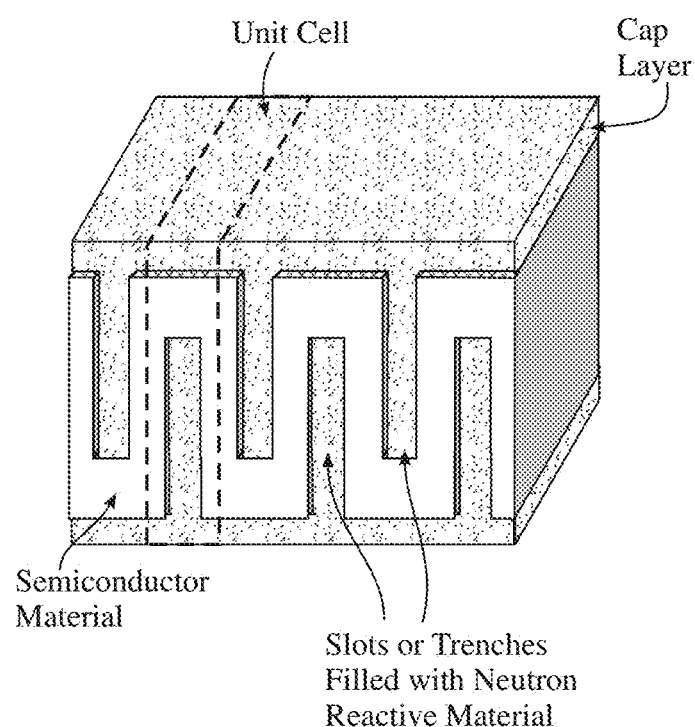
FIG. 4 shows a Double-Sided Microstructured Semiconductor Neutron Detector of prior art with interwoven channels.
Figure 5:
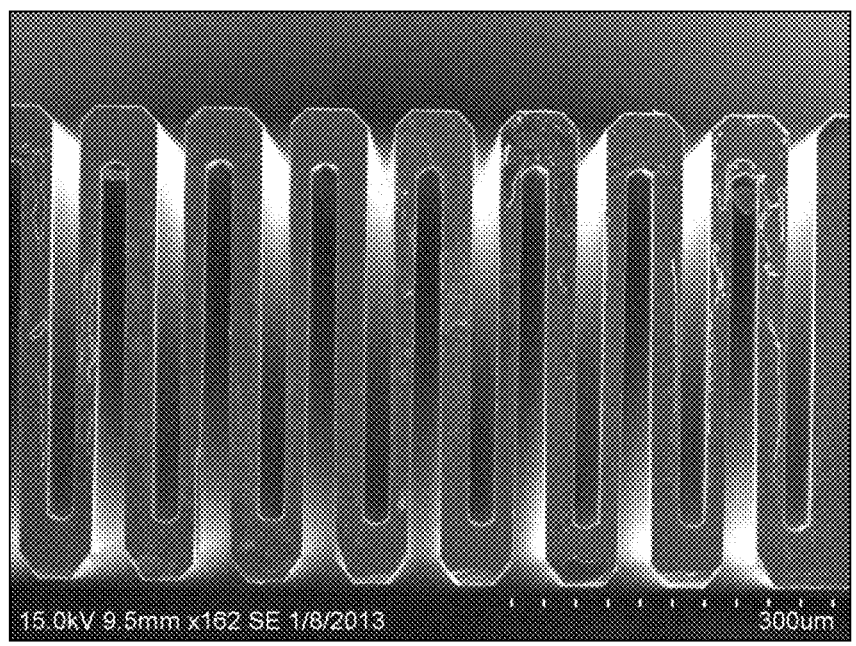
FIG. 5 shows a fabricated Double-Sided Microstructured Semiconductor Neutron Detector of prior art with interwoven channels as reduced to practice.
Figure 6:
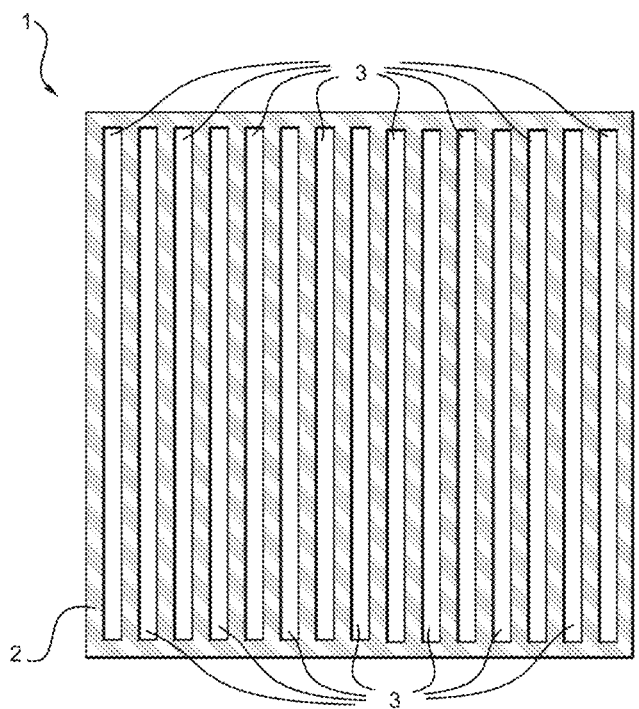
FIG. 6 is a top view diagram of a Double-Sided Microstructured Semiconductor Neutron Detector that shows an array of linear trenches etched into a semiconductor substrate, all backfilled with neutron reactive material.
Figure 7:
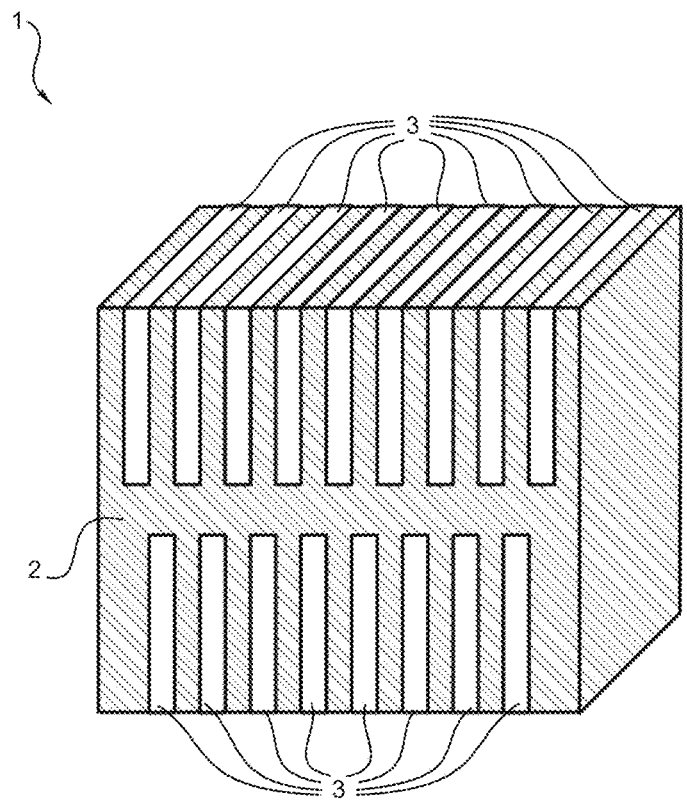
FIG. 7 is an isometric view diagram of a Double-Sided Microstructured Semiconductor Neutron Detector that shows arrays of linear trenches etched into a semiconductor substrate from both sides, all backfilled with neutron reactive material.
Figure 8:
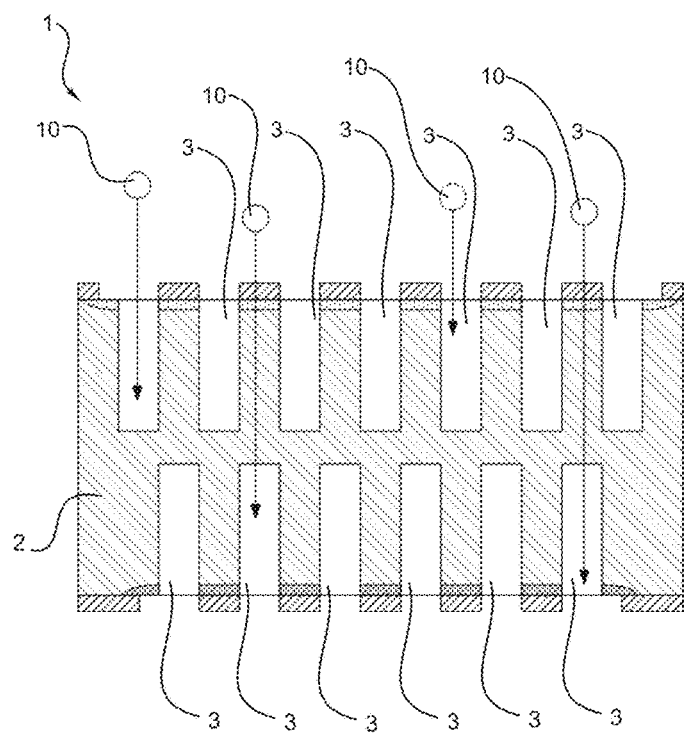
FIG. 8 is a cross section side view diagram of a Double-Sided Microstructured Semiconductor Neutron Detector that shows arrays of linear trenches etched into a semiconductor substrate from both sides, all backfilled with neutron reactive material, which also shows that neutron streaming is nearly eliminated with the design.

Referring to FIG. 8, there is shown a double-sided MSND, hereafter referred to as a DS-MSND, showing some neutrons 10 are absorbed in the upper neutron absorbing material 3 and also some neutrons 10 streaming through the semiconductor 2 of the upper etched pattern past the neutron absorber 3, but are subsequently absorbed in the neutron reactive material 3 of the lower etched features. Neutrons 10 absorbed in the neutron reactive material 3 eject charged particle reaction products, as described by equations 1 and 2, or other reaction products from other neutron reactive materials such as U, Th, Pu and Gd, which upon entering the adjacent semiconductor material cause ionization in the semiconductor material. The ionization, which takes the form of electron-hole charge carrier pairs, moves by the influence of an internal electric field, thereby, producing an output signal that indicates the detection of a neutron.

Figure 9:
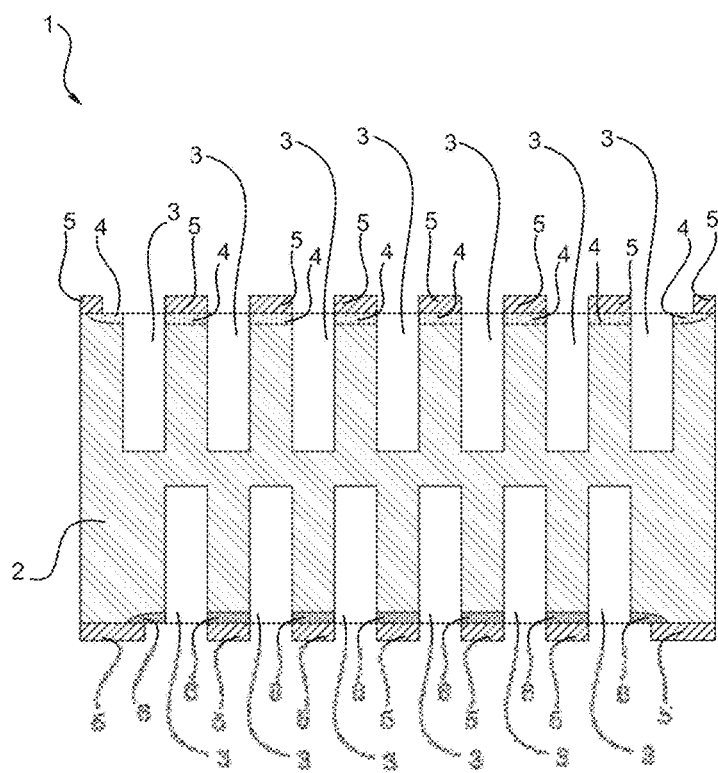
FIG. 9 is a cross section side view diagram of a Double-Sided Microstructured Semiconductor Neutron Detector that shows arrays of linear trenches etched into a semiconductor substrate from both sides, all backfilled with neutron reactive material, into either a surface-doped p-π-n or p-v-n diode structure.

Referring to FIG. 9, there is shown a DS-MSND 1 of a preferred embodiment. The semiconductor detector material 2 has p-type doped regions 4 atop the upper etched features and n-type doped regions 6 atop the lower etched features. Metal contacts 5 are formed atop the doped regions 4 and 6. The diode can be formed by using a semiconductor 2 of intrinsic, p-type, or n-type variety. The etched features are backfilled with neutron reactive material 3, which can be boron or boron compounds, lithium or lithium compounds, gadolinium or gadolinium compounds, uranium, thorium, plutonium, and hydrogenous materials such as polyethylene.

Figure 10:
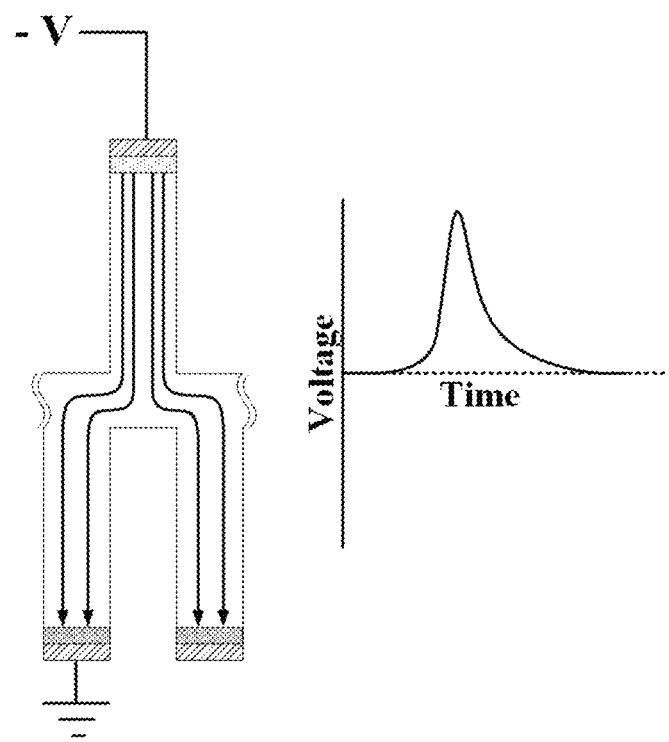
FIG. 10 is a partial cross section side view diagram of a Double-Sided Microstructured Semiconductor Neutron Detector that depicts the drift paths of charge carriers in a either a surface-doped p-π-n or p-v-n diode structure.

Referring to FIG. 10, there is shown a surface-type diffusion partial profile cross section side view diagram of a DS-MSND that depicts the drift paths of charge carriers in a either a surface-doped p-π-n or p-v-n diode structure. The electric field produced by the diode structure of FIG. 9 forces electrons and holes, excited by reaction products entering into the semiconductor from neutron reactions originating in the neutron reactive material, along the drift paths shown in the figure. Also shown is a depiction of the output voltage pulse expected from such a design.

Figure 11:
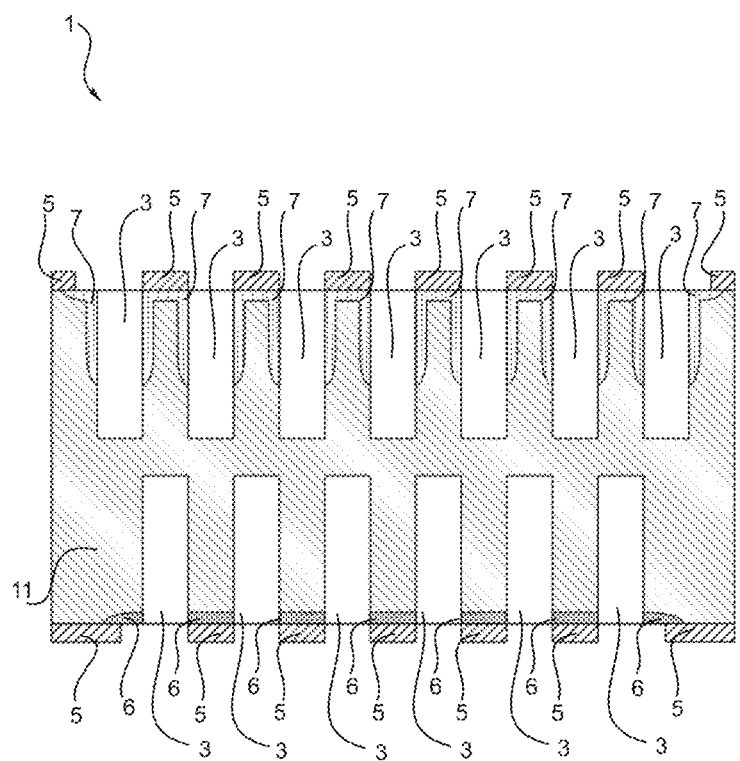
FIG. 11 is a cross section side view diagram of a Double-Sided Microstructured Semiconductor Neutron Detector that shows arrays of linear trenches etched into a semiconductor substrate from both sides, all backfilled with neutron reactive material, into a structure with a semi-conformal p-type top contact, v-type semiconductor, and a n-type surface-doped bottom contact.

Referring to FIG. 11, there is shown a DS-MSND 1 of a preferred embodiment. The semiconductor detector material 11 has semi-conformal p-type doped regions 7 around the upper etched features and n-type surface-doped regions 6 atop the lower etched features. Metal contacts 5 are formed atop the doped regions 7 and 6. The diode can be formed by using a semiconductor 11 of intrinsic or n-type variety. The etched features are backfilled with neutron reactive material 3, which can be boron or boron compounds, lithium or lithium compounds, gadolinium or gadolinium compounds, uranium, thorium, plutonium, and hydrogenous materials such as polyethylene.

Figure 12:
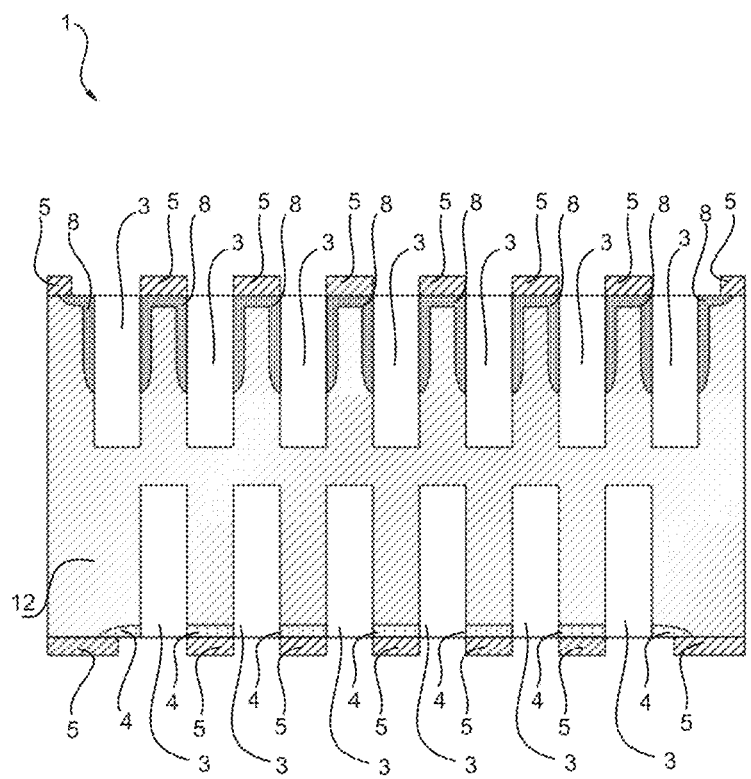
FIG. 12 is a cross section side view diagram of a Double-Sided Microstructured Semiconductor Neutron Detector that shows arrays of linear trenches etched into a semiconductor substrate from both sides, all backfilled with neutron reactive material, into a structure with a semi-conformal n-type top contact, π-type semiconductor, and a p-type surface-doped bottom contact.

Referring to FIG. 12, there is shown a DS-MSND 1 of a preferred embodiment. The semiconductor detector material 12 has semi-conformal n-type doped regions 8 around the upper etched features and p-type surface-doped regions 4 atop the lower etched features. Metal contacts 5 are formed atop the doped regions 8 and 4. The diode can be formed by using a semiconductor 12 of intrinsic or p-type variety. The etched features are backfilled with neutron reactive material 3, which can be boron or boron compounds, lithium or lithium compounds, gadolinium or gadolinium compounds, uranium, thorium, plutonium, and hydrogenous materials such as polyethylene.

Figure 13:
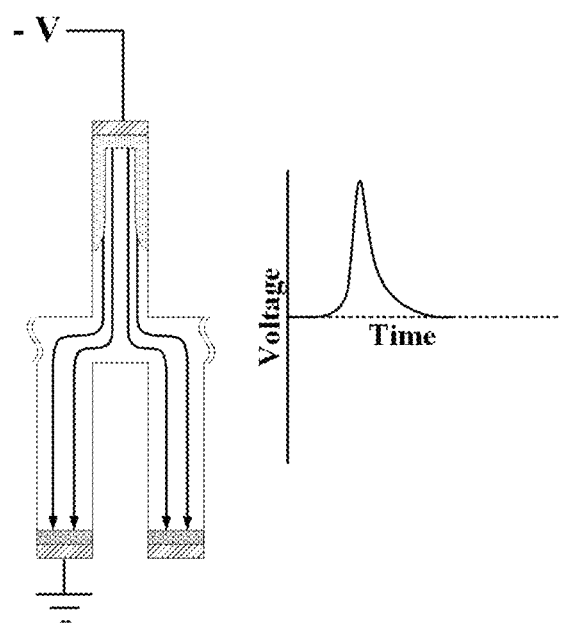
FIG. 13 is a partial cross section side view diagram of a Double-Sided Microstructured Semiconductor Neutron Detector that depicts the drift paths of charge carriers in a combined semi-conformal to surface-doped p-π-n or p-v-n diode structure.

Referring to FIG. 13, there is shown a partial profile cross section side view diagram of a combined semi-conformal and surface-type diffusion of a DS-MSND that depicts the drift paths of charge carriers in a either a surface-doped p-v-n or n-π-p diode structure. The electric field produced by the diode structures of FIGS. 11 and 12 forces electrons and holes, excited by reaction products entering into the semiconductor from neutron reactions originating in the neutron reactive material, along the drift paths shown in the figure. Also shown is a depiction of the output voltage pulse expected from such a design.

Figure 14:
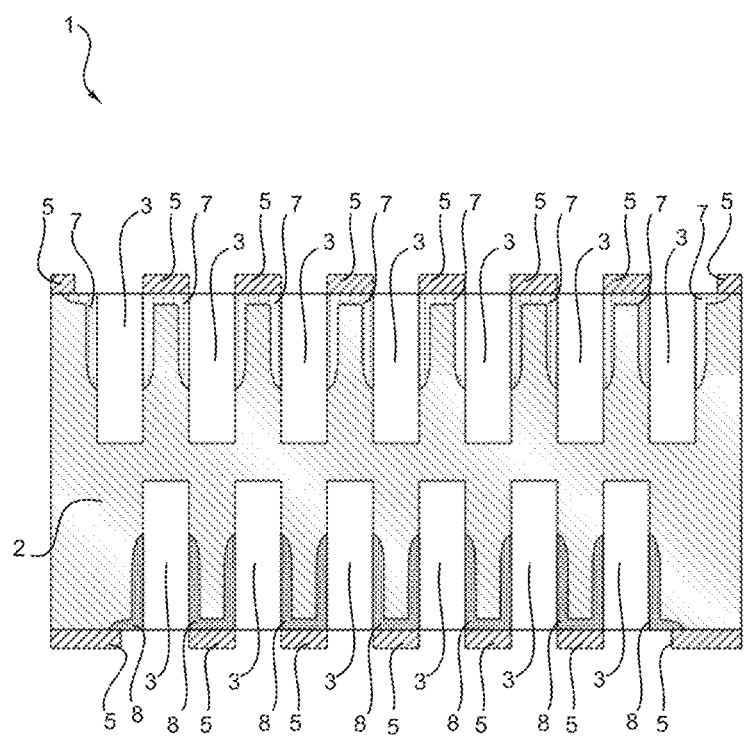
FIG. 14 is a cross section side view diagram of a Double-Sided Microstructured Semiconductor Neutron Detector that shows arrays of linear trenches etched into a semiconductor substrate from both sides, all backfilled with neutron reactive material, into a structure with a semi-conformal p-type top contact, v-type or π-type semiconductor, and a semi-conformal n-type bottom contact.

Referring to FIG. 14, there is shown a DS-MSND 1 of a preferred embodiment. The semiconductor detector material 2 has semi-conformal p-type doped regions 7 around the upper etched features and semi-conformal n-type regions 8 around the lower etched features. Metal contacts 5 are formed atop the doped regions 7 and 8. The diode can be formed by using a semiconductor 2 of intrinsic, p-type, or n-type variety. The etched features are backfilled with neutron reactive material 3, which can be boron or boron compounds, lithium or lithium compounds, gadolinium or gadolinium compounds, uranium, thorium, plutonium, and hydrogenous materials such as polyethylene.

Figure 15:
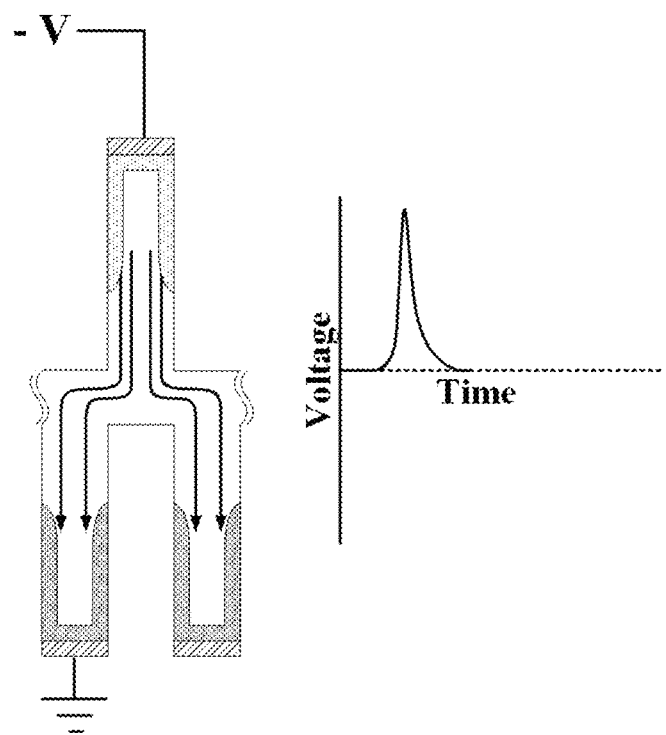
FIG. 15 is a partial cross section side view diagram of a Double-Sided Microstructured Semiconductor Neutron Detector that depicts the drift paths of charge carriers in a semi-conformal to semi-conformal p-π-n or p-v-n diode structure.

Referring to FIG. 15, there is shown a partial profile cross section side view diagram of a semi-conformal doped DS-MSND that depicts the drift paths of charge carriers in a either a semi-conformal-doped p-v-n or n-π-p diode structure. The electric field produced by the diode structures of FIG. 14 forces electrons and holes, excited by reaction products entering into the semiconductor from neutron reactions originating in the neutron reactive material, along the drift paths shown in the figure. Also shown is a depiction of the output voltage pulse expected from such a design.

Figure 16:
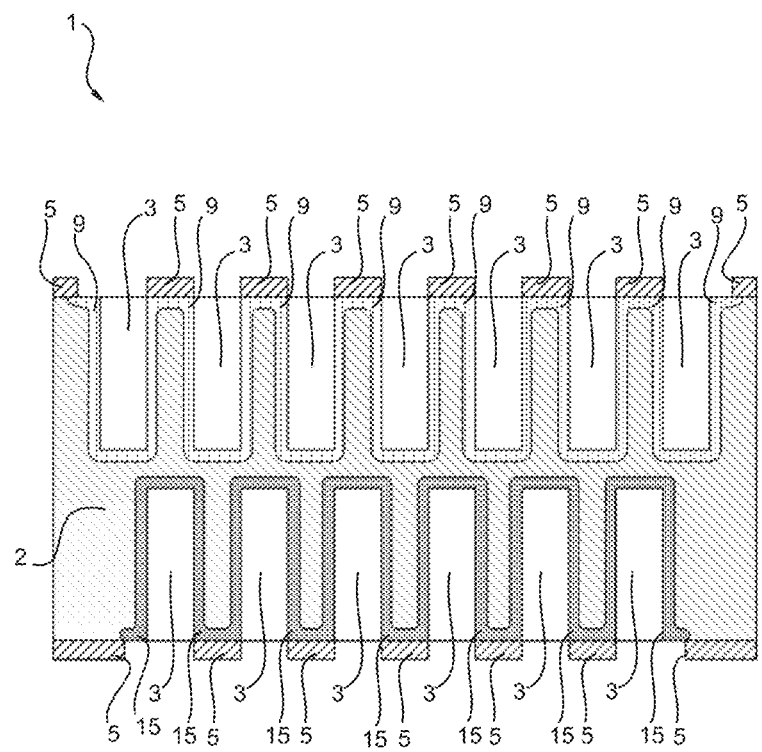
FIG. 16 is a cross section side view diagram of a Double-Sided Microstructured Semiconductor Neutron Detector that shows arrays of linear trenches etched into a semiconductor substrate from both sides, all backfilled with neutron reactive material, into a structure with a conformal p-type top contact, v-type or π-type semiconductor, and a conformal n-type bottom contact.

Referring to FIG. 16, there is shown a DS-MSND 1 of a preferred embodiment. The semiconductor detector material 2 has conformal p-type doped regions 9 around and in the upper etched features and n-type conformal n-type regions 15 around and in the lower etched features. Metal contacts 5 are formed atop the doped regions 9 and 15. The diode can be formed by using a semiconductor 2 of intrinsic, p-type, or n-type variety. The etched features are backfilled with neutron reactive material 3, which can be boron or boron compounds, lithium or lithium compounds, gadolinium or gadolinium compounds, uranium, thorium, plutonium, and hydrogenous materials such as polyethylene.

Figure 17:
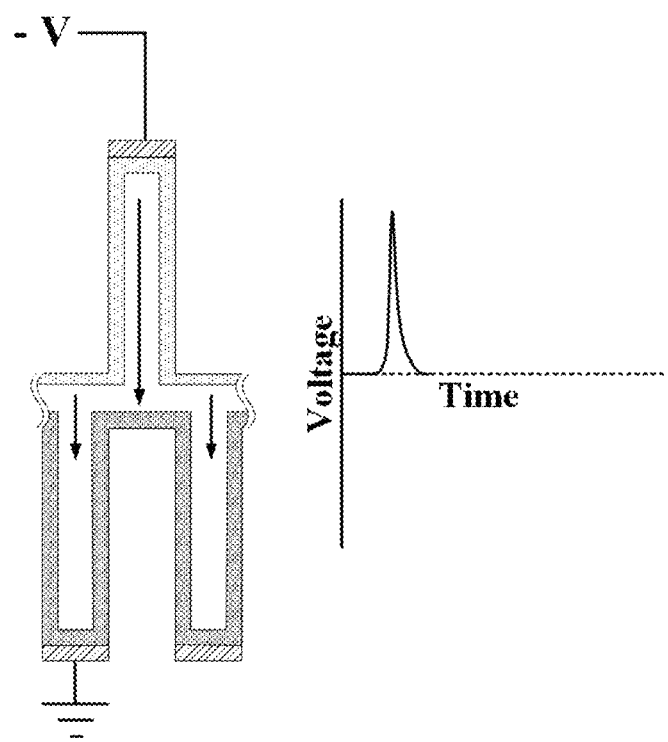
FIG. 17 is a partial cross section side view diagram of a Double-Sided Microstructured Semiconductor Neutron Detector that depicts the drift paths of charge carriers in a structure with a conformal p-type top contact, v-type or π-type semiconductor, and a conformal n-type bottom contact.

Referring to FIG. 17, there is shown a partial profile cross section side view diagram of a conformal doped DS-MSND that depicts the drift paths of charge carriers in a either a conformal-doped p-v-n or n-π-p diode structure. The electric field produced by the diode structures of FIG. 16 forces electrons and holes, excited by reaction products entering into the semiconductor from neutron reactions originating in the neutron reactive material, along the drift paths shown in the figure. Also shown is a depiction of the output voltage pulse expected from such a design.

Figure 18:
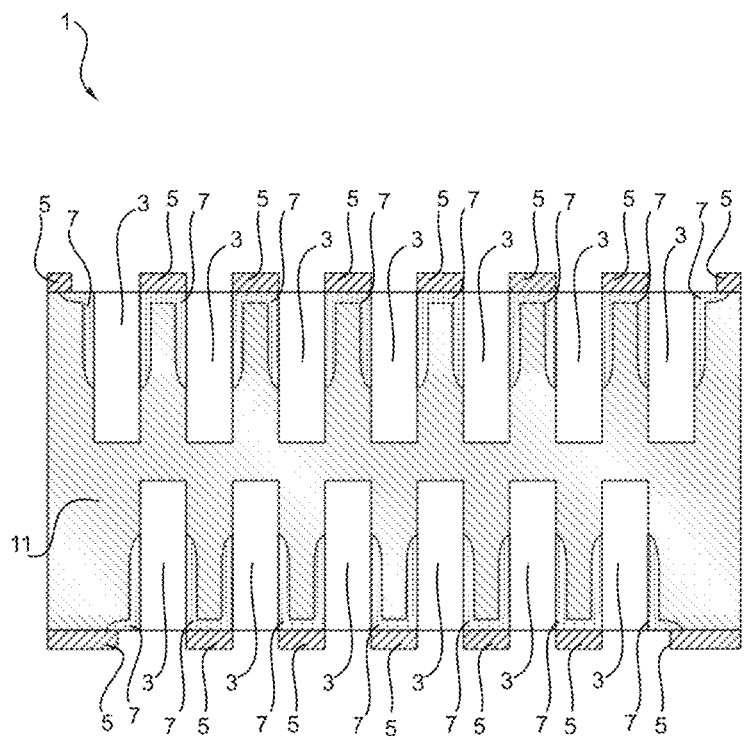
FIG. 18 is a cross section side view diagram of a Double-Sided Microstructured Semiconductor Neutron Detector that shows arrays of linear trenches etched into a semiconductor substrate from both sides, all backfilled with neutron reactive material, into a structure with a semi-conformal p-type top contact, v-type semiconductor, and a semi-conformal p-type bottom contact.

Referring to FIG. 18, there is shown a DS-MSND 1 of a preferred embodiment. The semiconductor detector material 11 has semi-conformal p-type doped regions 7 around the upper etched features and semi-conformal p-type regions 7 around the lower etched features. Metal contacts 5 are formed atop the upper and lower doped regions 7. The diode can be formed by using a semiconductor 11 of intrinsic or n-type variety. The etched features are backfilled with neutron reactive material 3, which can be boron or boron compounds, lithium or lithium compounds, gadolinium or gadolinium compounds, uranium, thorium, plutonium, and hydrogenous materials such as polyethylene.

Figure 19:
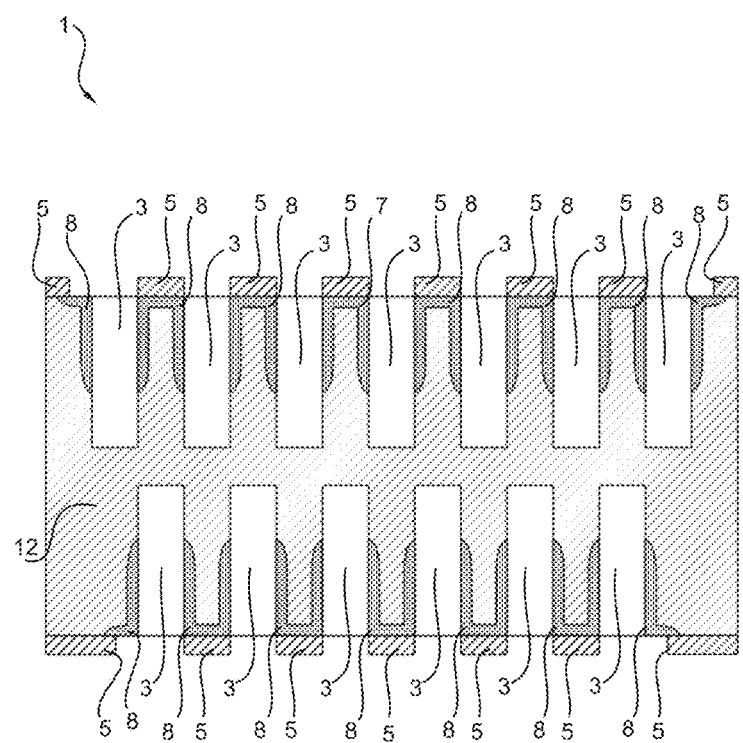
FIG. 19 is a cross section side view diagram of a Double-Sided Microstructured Semiconductor Neutron Detector that shows arrays of linear trenches etched into a semiconductor substrate from both sides, all backfilled with neutron reactive material, into a structure with a semi-conformal n-type top contact, π-type semiconductor, and a semi-conformal n-type bottom contact.

Referring to FIG. 19, there is shown a DS-MSND 1 of a preferred embodiment. The semiconductor detector material 12 has semi-conformal p-type doped regions 8 around the upper etched features and semi-conformal p-type regions 8 around the lower etched features. Metal contacts 5 are formed atop the upper and lower doped regions 8. The diode can be formed by using a semiconductor 12 of intrinsic or n-type variety. The etched features are backfilled with neutron reactive material 3, which can be boron or boron compounds, lithium or lithium compounds, gadolinium or gadolinium compounds, uranium, thorium, plutonium, and hydrogenous materials such as polyethylene.

Figure 20:
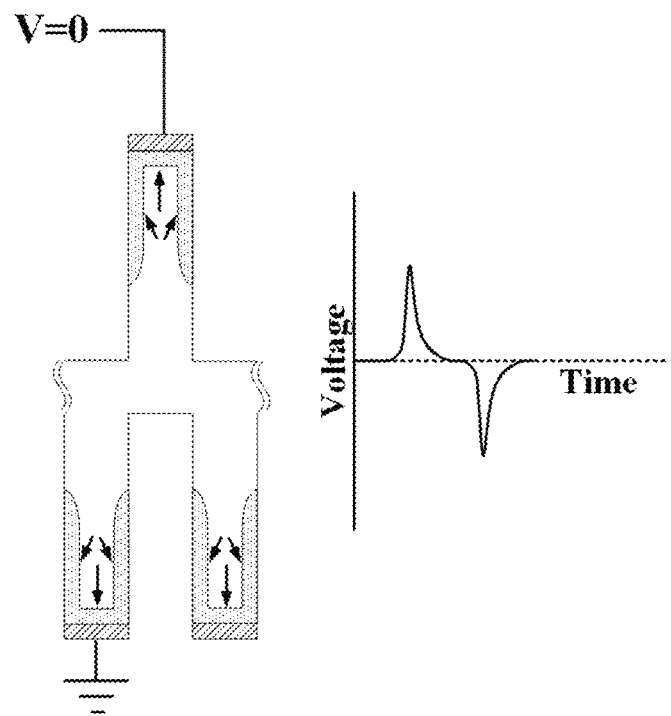
FIG. 20 is a partial cross section side view diagram of a Double-Sided Microstructured Semiconductor Neutron Detector that depicts the drift paths of charge carriers in a structure with either a semi-conformal p-type top contact, v-type semiconductor, and a semi-conformal p-type bottom contact or a semi-conformal n-type top contact, π-type semiconductor, and a semi-conformal n-type bottom contact.

Referring to FIG. 20, there is shown a partial profile cross section side view diagram of a semi-conformal doped DS-MSND that depicts the drift paths of charge carriers in a either a semi-conformal-doped p-v-p or n-π-n diode structure. The electric field produced by the diode structures of FIGS. 18 and 19 forces electrons and holes, excited by reaction products entering into the semiconductor from neutron reactions originating in the neutron reactive material, along the drift paths shown in the figure. Also shown is a depiction of the output voltage pulse expected from such a design.

Figure 21:
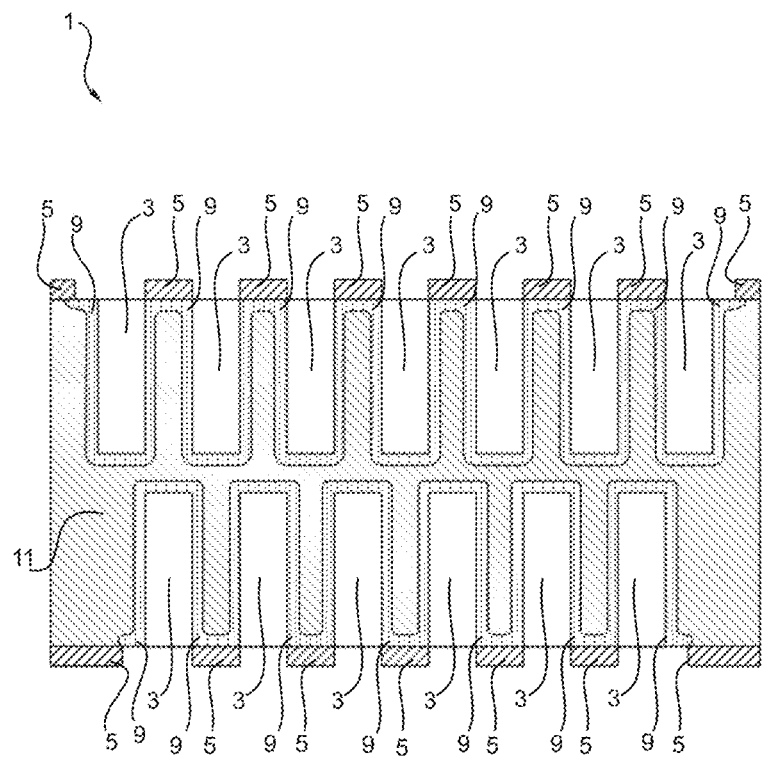
FIG. 21 is a cross section side view diagram of a Double-Sided Microstructured Semiconductor Neutron Detector that shows arrays of linear trenches etched into a semiconductor substrate from both sides, all backfilled with neutron reactive material, into a structure with a conformal p-type top contact, v-type semiconductor, and a conformal p-type bottom contact.

Referring to FIG. 21, there is shown a DS-MSND 1 of a preferred embodiment. The semiconductor detector material 11 has semi-conformal p-type doped regions 9 around the upper etched features and semi-conformal p-type regions 9 around the lower etched features. Metal contacts 5 are formed atop the upper and lower doped regions 9. The diode can be formed by using a semiconductor 11 of intrinsic or n-type variety. The etched features are backfilled with neutron reactive material 3, which can be boron or boron compounds, lithium or lithium compounds, gadolinium or gadolinium compounds, uranium, thorium, plutonium, and hydrogenous materials such as polyethylene.

Figure 22:
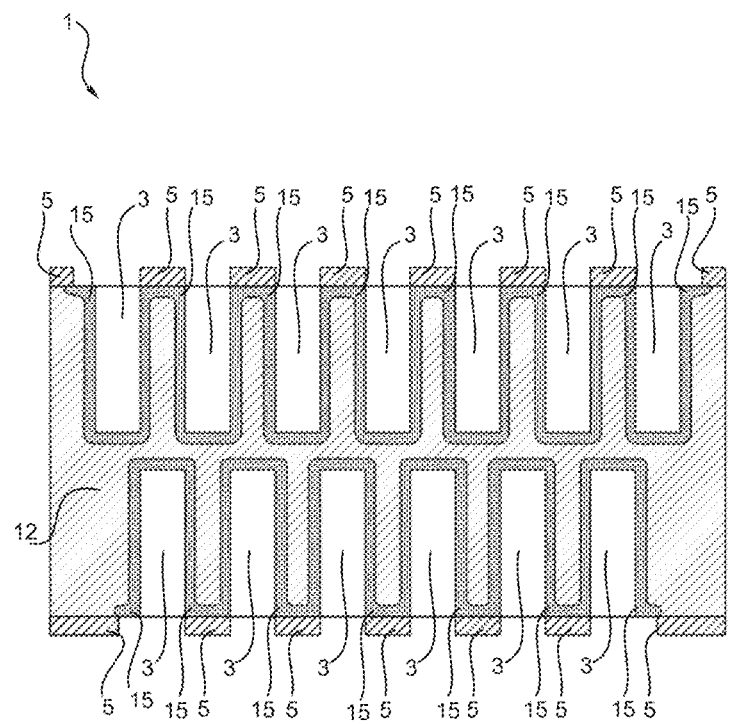
FIG. 22 is a cross section side view diagram of a Double-Sided Microstructured Semiconductor Neutron Detector that shows arrays of linear trenches etched into a semiconductor substrate from both sides, all backfilled with neutron reactive material, into a structure with a conformal n-type top contact, π-type semiconductor, and a conformal n-type bottom contact.

Referring to FIG. 22, there is shown a DS-MSND 1 of a preferred embodiment. The semiconductor detector material 12 has semi-conformal p-type doped regions 15 around the upper etched features and semi-conformal p-type regions 15 around the lower etched features. Metal contacts 5 are formed atop the upper and lower doped regions 15. The diode can be formed by using a semiconductor 12 of intrinsic or n-type variety. The etched features are backfilled with neutron reactive material 3, which can be boron or boron compounds, lithium or lithium compounds, gadolinium or gadolinium compounds, uranium, thorium, plutonium, and hydrogenous materials such as polyethylene.

Figure 23:
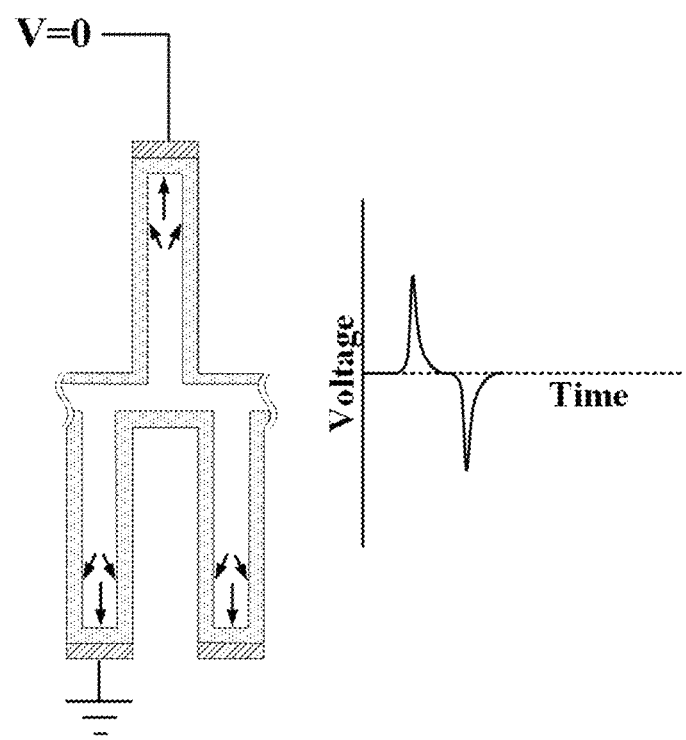
FIG. 23 is a partial cross section side view diagram of a Double-Sided Microstructured Semiconductor Neutron Detector that depicts the drift paths of charge carriers in a structure with either a conformal p-type top contact, v-type semiconductor, and a conformal p-type bottom contact or a conformal n-type top contact, π-type semiconductor, and a conformal n-type bottom contact.

Referring to FIG. 23, there is shown a partial profile cross section side view diagram of a semi-conformal doped DS-MSND that depicts the drift paths of charge carriers in a either a semi-conformal-doped p-v-p or n-π-n diode structure. The electric field produced by the diode structures of FIGS. 21 and 22 forces electrons and holes, excited by reaction products entering into the semiconductor from neutron reactions originating in the neutron reactive material, along the drift paths shown in the figure. Also shown is a depiction of the output voltage pulse expected from such a design.

Figure 24:
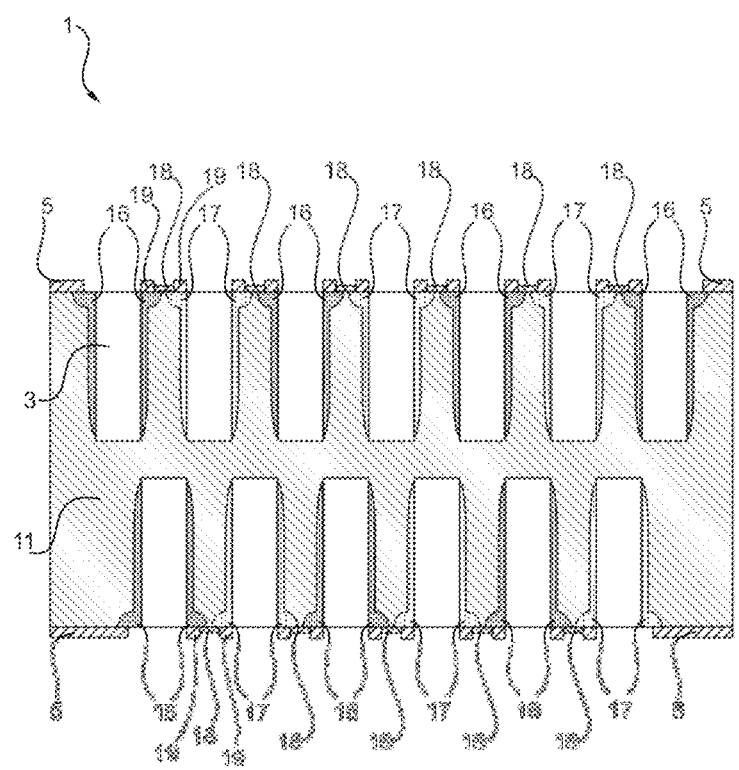
FIG. 24 is a cross section side view diagram of a Double-Sided Microstructured Semiconductor Neutron Detector that shows arrays of linear trenches etched into a semiconductor substrate from both sides, all backfilled with neutron reactive material, into a structure with a lateral arrangement of adjacent p-v-n or p-π-n diodes fabricated into the trench structures.

Referring to FIG. 24, there is shown a DS-MSND 1 of a preferred embodiment. The semiconductor detector material 11 has features etch into the top and bottom offset to reduce neutron streaming. Adjacent etched features have alternating doping types, alternating between p-type regions 17 inside the etched features and n-type regions 16 inside the etched features. Both sides of the embodiment etched features follow this same alternating doping scheme. Metal contacts 5 and 19 are formed atop the upper and lower doped regions 16 and 17, separated by an electrically insulating material 18. The diode can be formed by using a semiconductor 11 of intrinsic, p-type or n-type variety. The etched features are backfilled with neutron reactive material 3, which can be boron or boron compounds, lithium or lithium compounds, gadolinium or gadolinium compounds, uranium, thorium, plutonium, and hydrogenous materials such as polyethylene.

Figure 25:
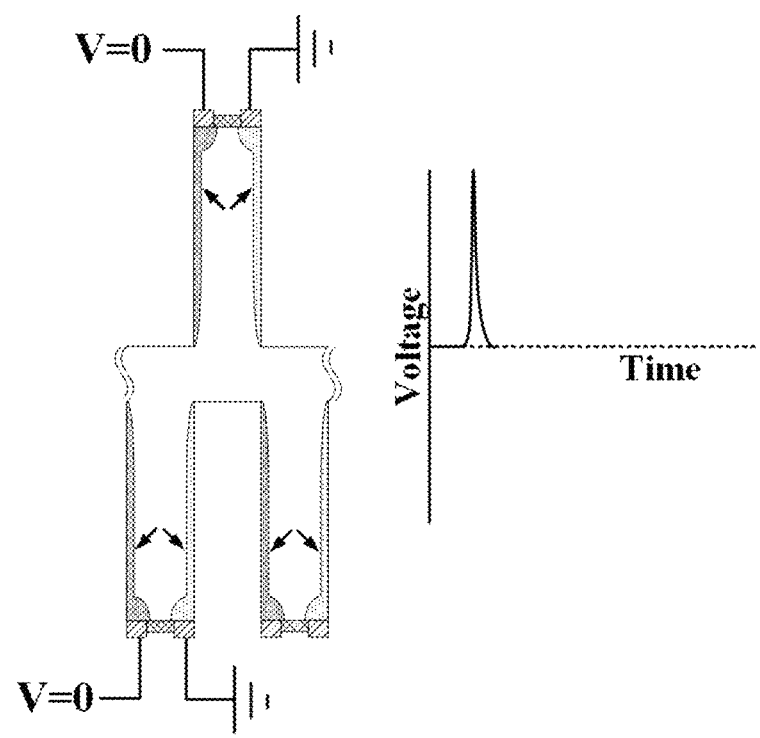
FIG. 25 is a partial cross section side view diagram of a Double-Sided Microstructured Semiconductor Neutron Detector that depicts the drift paths of charge carriers in a structure with a lateral arrangement of adjacent p-v-n or p-π-n diodes fabricated into the trench structures.

Referring to FIG. 25, there is shown a partial profile cross section side view diagram DS-MSND that depicts the drift paths of charge carriers for the doping structure of FIG. 24. The electric field produced by the diode structure of FIG. 24 forces electrons and holes, excited by reaction products entering into the semiconductor from neutron reactions originating in the neutron reactive material, along the drift paths shown in the figure. Also shown is a depiction of the output voltage pulse expected from such a design.

Figure 26:
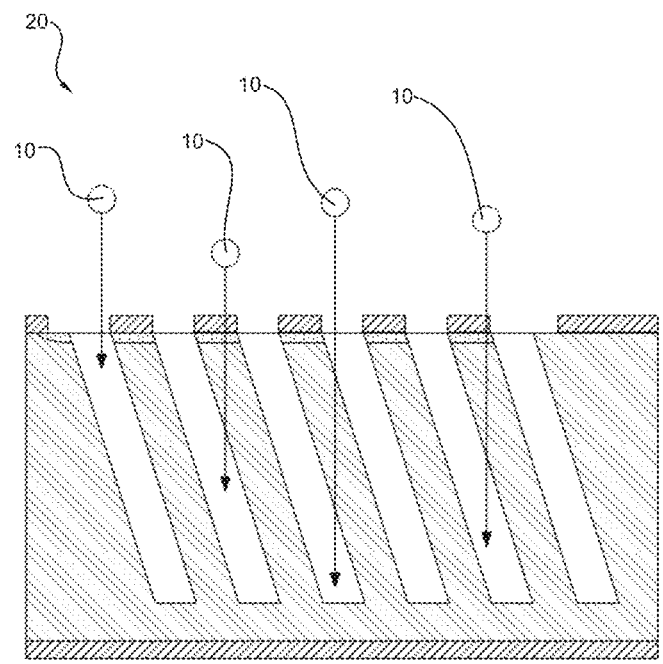
FIG. 26 is a cross section side view diagram of a Single-Sided Microstructured Semiconductor Neutron Detector that shows arrays of linear trenches etched diagonally into a semiconductor substrate from both sides, all backfilled with neutron reactive material, which also shows that neutron streaming is nearly eliminated with the design.

Referring to FIG. 26, there is shown a single sided MSND 20 of a preferred embodiment, in which the etched features are developed at a slanted angle to the normal of the surface. These slanted features prevent neutrons 10 from streaming through the detector.

Figure 27:
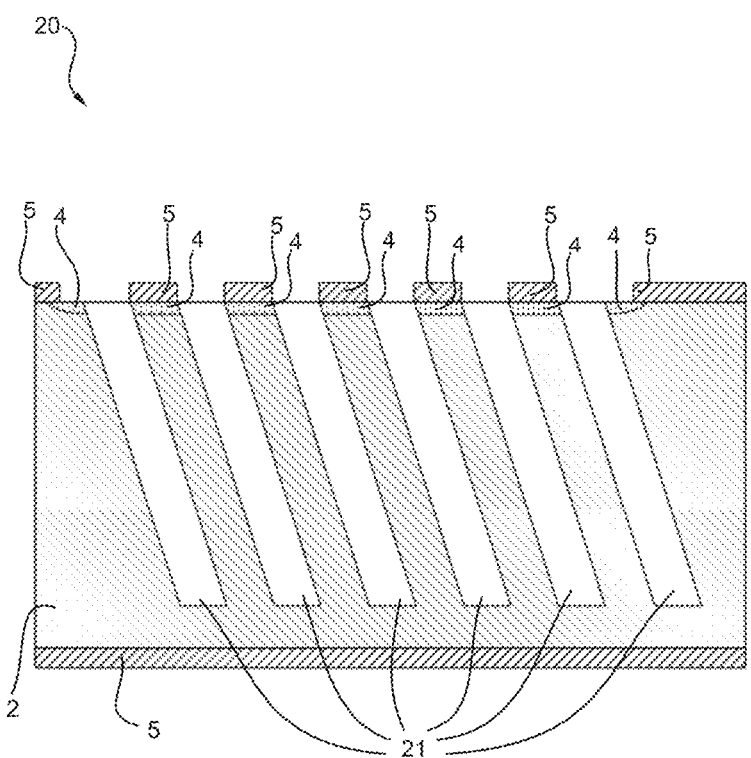
FIG. 27 is a cross section side view diagram of a Single-Sided Microstructured Semiconductor Neutron Detector that shows arrays of linear trenches etched diagonally into a semiconductor substrate from both sides, into either a surface-doped p-π-n or p-v-n diode structure.

Referring to FIG. 27, there is shown a single sided MSND 20 of a preferred embodiment, in which the etched features are developed at a slanted angle to the normal of the surface. The diode is formed with surface-doped p-type regions 4 upon an n-type semiconductor 2, or by n-type surface-doped regions (6) upon a p-type semiconductor 2. Conductive contacts 5 are applied to the surfaces. The slanted etched features are backfilled with neutron reactive material 21, which can be boron or boron compounds, lithium or lithium compounds, gadolinium or gadolinium compounds, uranium, thorium, plutonium, and hydrogenous materials such as polyethylene.

Figure 28:
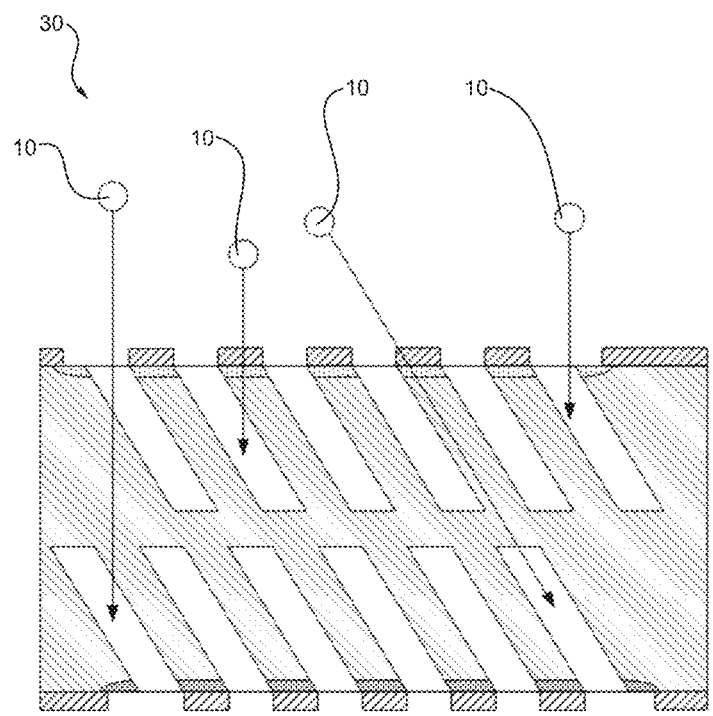
FIG. 28 is a cross section side view diagram of a Double-Sided Microstructured Semiconductor Neutron Detector that shows arrays of linear trenches etched diagonally into a semiconductor substrate from both sides, all backfilled with neutron reactive material, which also shows that neutron streaming is nearly eliminated with the design.

Referring to FIG. 28, there is shown a DS-MSND 30 of a preferred embodiment, in which the etched features are developed at a slanted angle 31 to the normal of both surfaces. These slanted features prevent neutrons 10 from streaming through the detector.

Figure 29:
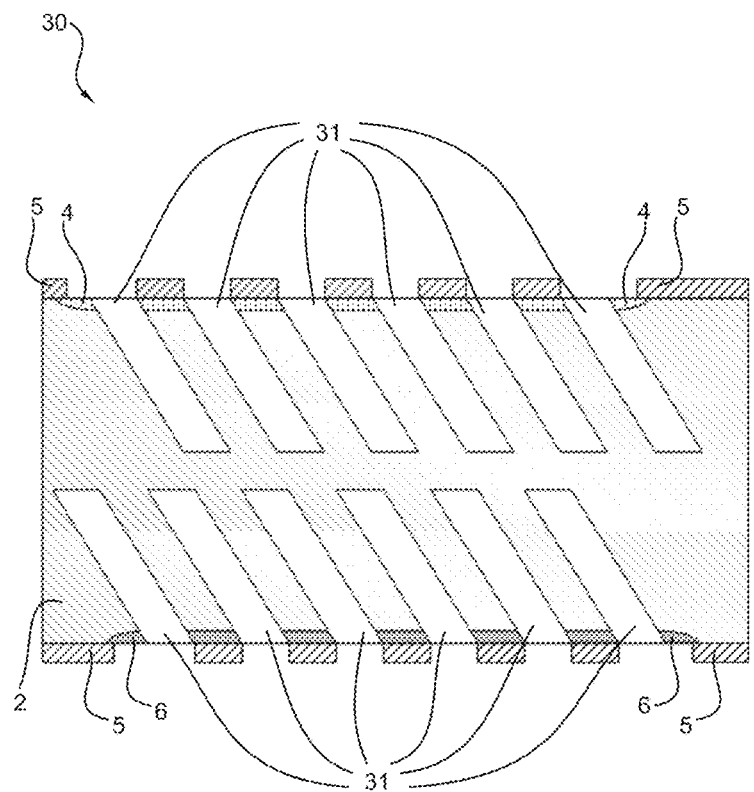
FIG. 29 is a cross section side view diagram of a Double-Sided Microstructured Semiconductor Neutron Detector that shows arrays of linear trenches etched diagonally into a semiconductor substrate from both sides, into either a surface-doped p-π-n or p-v-n diode structure.

Referring to FIG. 29, there is shown a DS-MSND 30 of a preferred embodiment, in which the etched features are developed at a slanted angle to the normal of the surface. The diode is formed with surface-doped p-type regions 4 upon a semiconductor 2 and n-type surface-doped regions 6 upon the opposing features. Conductive contacts 5 are applied to the surfaces. The diode can be formed by using a semiconductor 2 of intrinsic, p-type, or n-type variety. The slanted etched features are backfilled with neutron reactive material 31, which can be boron or boron compounds, lithium or lithium compounds, gadolinium or gadolinium compounds, uranium, thorium, plutonium, and hydrogenous materials such as polyethylene.

Figure 30:
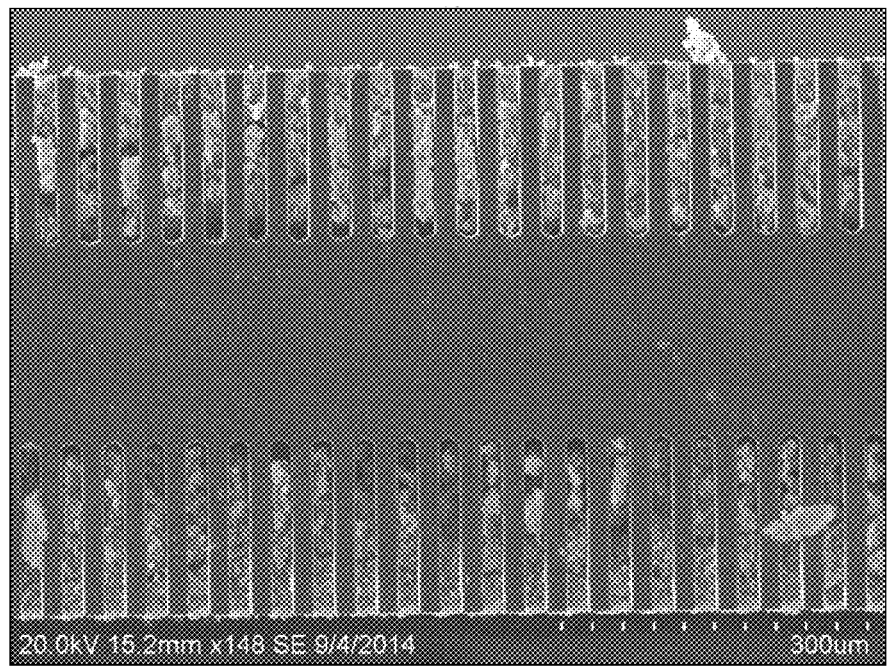
FIG. 30 shows a fabricated Double-Sided Microstructured Semiconductor Neutron Detector with opposing channels backfilled with LiF as reduced to practice.

Referring to FIG. 30, there is shown a scanning electron microscope photograph of a DS-MSND fabricated from silicon and backfilled with LiF nanopowder.

Figure 31:
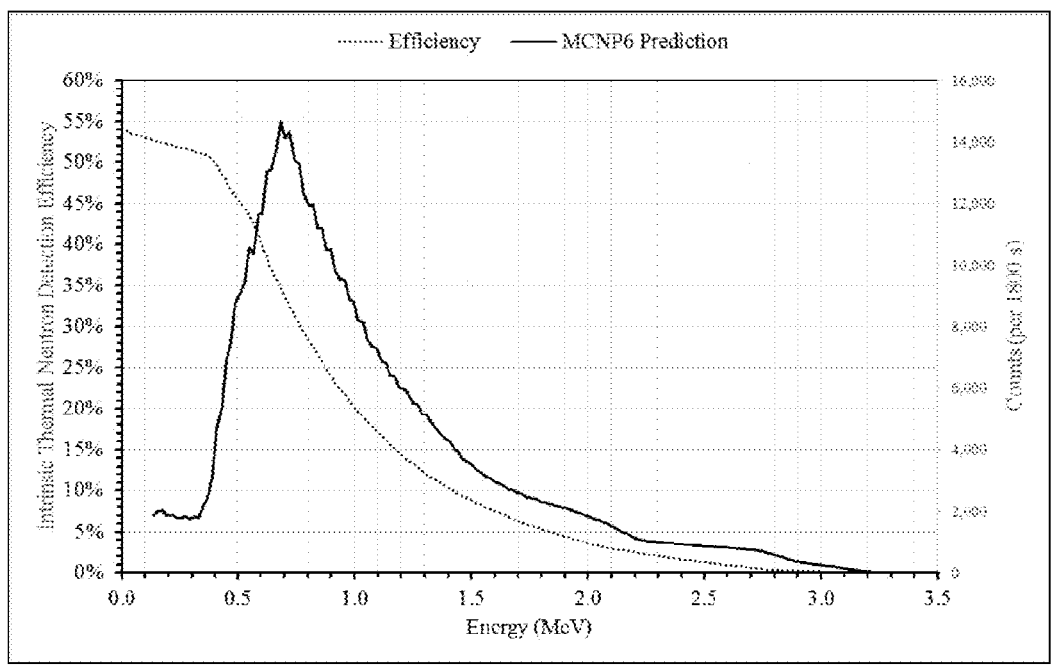
FIG. 31 shows the modeled and calculated pulse height spectrum and efficiency from a Double-Sided Microstructured Semiconductor Neutron Detector with opposing channels backfilled with LiF.

Referring to FIG. 31, there is shown the theoretically calculated and predicted pulse height spectrum from a DS-MSND and the expected intrinsic thermal neutron detection efficiency as a function of the lower level discriminator setting.

Figure 32:
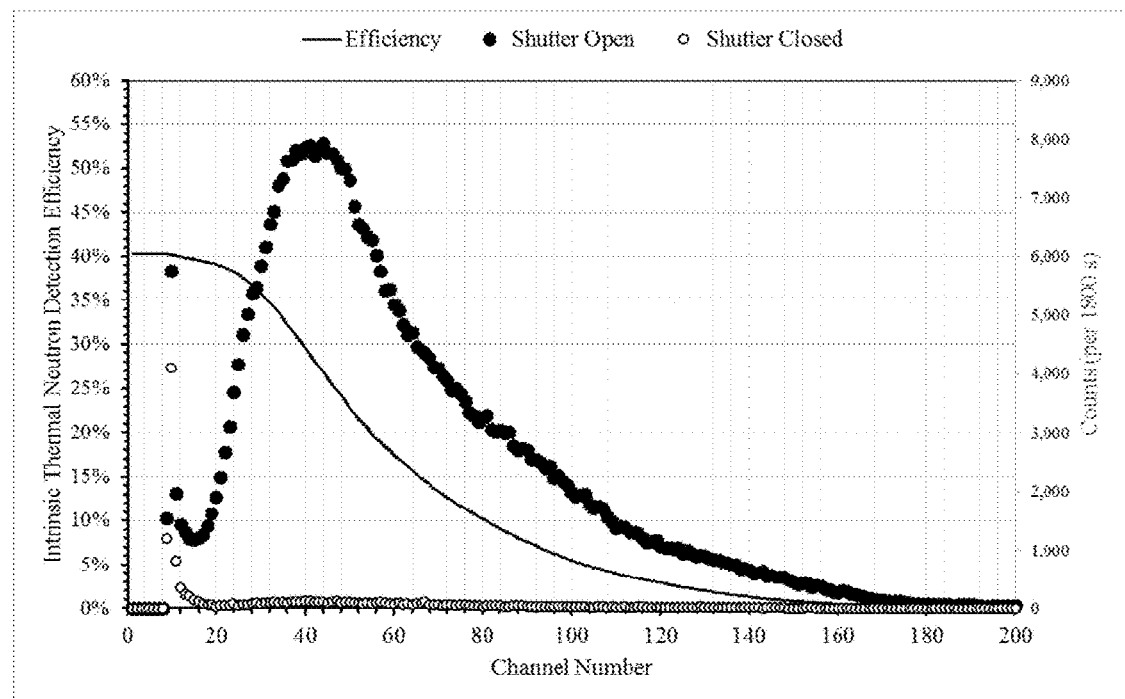
FIG. 32 shows the measured pulse height spectrum and measured efficiency from a Double-Sided Microstructured Semiconductor Neutron Detector with opposing channels backfilled with LiF.

Referring to FIG. 32, there is shown the experimentally measured pulse height spectrum response to thermal neutrons from a nuclear reactor beamport as measured with a DS-MSND and the expected intrinsic thermal neutron detection efficiency as a function of the lower level discriminator setting. Also shown is the response of the detector when a Cd shutter is used to completely block neutrons, clearly showing that the detector is indeed responding to the neutrons in the former case and not responding to neutrons in the latter case.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A high-efficiency semiconductor neutron detector comprising:
   a single, particle-detecting substrate composed primarily of a semiconductor material having a top face on which neutrons are incident, a bottom face opposite the top face and a plurality of cavities, each of the cavities extending from one of the faces into the substrate but not to the other of the faces, wherein the cavities extending into the substrate from the top face are not surrounded by any cavities extending into the substrate from the bottom face; and
   neutron-responsive material disposed in the plurality of cavities, the material being responsive to neutrons absorbed thereby for releasing ionizing radiation reaction products wherein the cavities are sized to allow at least one reaction product to laterally enter the semiconductor material, shaped such that normal incident neutrons to the top face or bottom face surfaces will pass through some portion of the neutron-responsive material within the cavities, and distributed throughout the substrate such that there is sufficient semiconductor material around the cavities to capture a measurable fraction of the reaction products ionization within the semiconductor, so that the detector is substantially opaque to the neutrons normally incident on the top face or bottom face.

2. The detector as claimed in claim 1, wherein a first array of cavities extend into the substrate from the top face and a second array of cavities extend into the substrate from the bottom face and wherein the detector is dual-sided.

3. The detector as claimed in claim 2, wherein the first and second arrays of cavities include etched trenches or slots.

4. The detector as claimed in claim 2, wherein the first and second arrays of cavities include angled etched trenches or slots.

5. The detector as claimed in claim 1, wherein all of the cavities extend into the substrate from the top face.

6. The detector as claimed in claim 5, wherein all of the cavities include an array of angled etched trenches or slots.

7. The detector as claimed in claim 1, wherein the semiconductor material is silicon, silicon carbide, gallium arsenide, gallium nitride, indium phosphide, cadmium telluride, cadmium-zinc-telluride, gallium phosphide, mercuric iodide, or lead iodide.

8. The detector as claimed in claim 1, wherein the neutron-responsive material includes elemental or compound forms of lithium, lithium fluoride, boron, gadolinium, any form of plastic, cadmium, $U^{235}$, Pu or Th.

9. The detector as claimed in claim 1, wherein the neutrons are thermal and or fast neutrons.

10. The detector as claimed in claim 1, further comprising a first contact layer disposed on the top face of the substrate and a second contact layer disposed on the bottom face of the substrate wherein the first and second contact layers are the same rectifying type.

11. The detector as claimed in claim 1, further comprising a first contact layer disposed on the top face of the substrate and a second contact layer disposed on the bottom face of the substrate wherein the first and second contact layers are different rectifying type.

12. The detector as claimed in claim 1, further comprising a first contact layer disposed within a first cavity and second contact layers disposed within second cavities adjacent the first cavity wherein the first contact layer is a different rectifying type from the second contact layers.

13. The detector as claimed in claim 1, further comprising contact layers in or on the substrate which are the same rectifying type wherein the detector produces either a positive polarity or negative polarity charge pulse per neutron absorption.

14. A method of making a high-efficiency semiconductor neutron detector, the method comprising:

providing a single, particle-detecting substrate composed primarily of a semiconductor material having a top face on which neutrons are incident, a bottom face opposite the top face and a plurality of cavities, each of the cavities extending from one of the faces into the substrate but not to the other of the faces, wherein the cavities extending into the substrate from the top face surfaces are not surrounded by any cavities extending into the substrate from the bottom face; and filling the plurality of cavities with neutron-responsive material, the material being responsive to neutrons absorbed thereby for releasing ionizing radiation reaction products wherein the cavities are sized to allow at least one reaction product to laterally enter the semiconductor material, shaped such that normal incident neutrons to the top face or bottom face surfaces will pass through some portion of the neutron-responsive material within the cavities, and distributed through the substrate such that there is sufficient semiconductor material around the cavities to capture a measurable fraction of the reaction products ionization within the semiconductor, so that the detector is substantially opaque to the neutrons normally incident on the top face.

* * * * *